United States Patent
Kandori et al.

(10) Patent No.: US 6,937,372 B2
(45) Date of Patent: Aug. 30, 2005

(54) LIGHT BEAM DEFLECTING APPARATUS, IMAGE FORMING APPARATUS UTILIZING THE SAME AND DRIVE METHOD THEREFOR

(75) Inventors: Atsushi Kandori, Kanagawa (JP); Masao Majima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/190,489

(22) Filed: Jul. 9, 2002

(65) Prior Publication Data

US 2003/0021497 A1 Jan. 30, 2003

(30) Foreign Application Priority Data

Jul. 11, 2001 (JP) ...................................... 2001-211036

(51) Int. Cl.[7] .............................................. G02B 26/08
(52) U.S. Cl. ........................ 359/198; 359/202; 359/212
(58) Field of Search ............................... 359/198, 202, 359/213, 212

(56) References Cited

U.S. PATENT DOCUMENTS

| | | | | |
|---|---|---|---|---|
| 4,329,011 A | * | 5/1982 | Mori et al. .................. | 359/213 |
| 4,329,012 A | * | 5/1982 | Minoura et al. ............ | 359/202 |
| 5,185,676 A | * | 2/1993 | Nishiberi .................... | 359/202 |
| 5,671,076 A | * | 9/1997 | Matsubara et al. ......... | 359/196 |
| 5,767,666 A | | 6/1998 | Asada et al. ................. | 324/97 |
| 5,835,249 A | * | 11/1998 | Yamada et al. ............. | 359/201 |
| 5,959,760 A | | 9/1999 | Yamada et al. ............. | 359/224 |
| 5,982,525 A | | 11/1999 | Matsubara et al. ......... | 359/212 |

FOREIGN PATENT DOCUMENTS

| | | |
|---|---|---|
| EP | 0 450 643 | 10/1991 |
| JP | 57-160662 | 10/1982 |
| JP | 58-155972 | 9/1983 |
| JP | 64-28535 | 1/1989 |
| JP | 2657769 | 6/1997 |
| JP | 2983088 | 9/1999 |
| JP | 3011144 | 12/1999 |

* cited by examiner

*Primary Examiner*—Euncha P. Cherry
(74) *Attorney, Agent, or Firm*—Fitzpatrick, Cella, Harper & Scinto

(57) ABSTRACT

A light beam deflecting apparatus which measures the passing time of a light beam in reciprocating scans on a specified position on the scanning line, and then calculates time lag data corresponding to the time lag in the reciprocating scan of a light beam deflecting device with respect to the drive signal therefor. From a measurement of two passing times in forward and backward scans, timing data is calculated, corresponding to the modulation start or end time of the light beam within a scanning cycle period. The invention resolves the drawback, in a light beam deflecting device for displaying an image by reciprocating light beam scannings, of image variation by variations for example in amplitude, phase and offset.

27 Claims, 13 Drawing Sheets

FIG. 6A
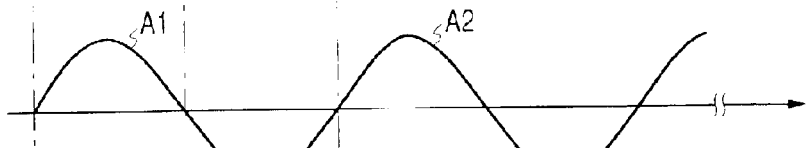
FIG. 6B
FIG. 6C
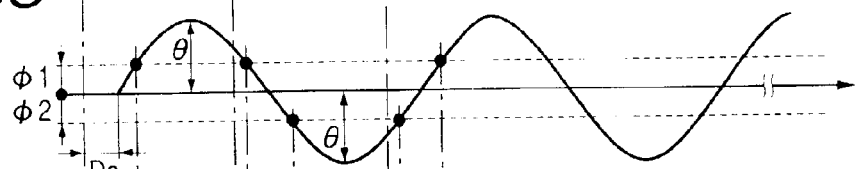
FIG. 6D
FIG. 6D'
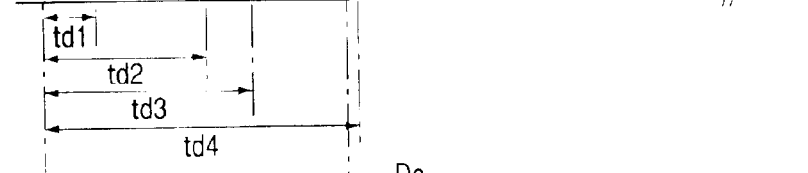
FIG. 6E
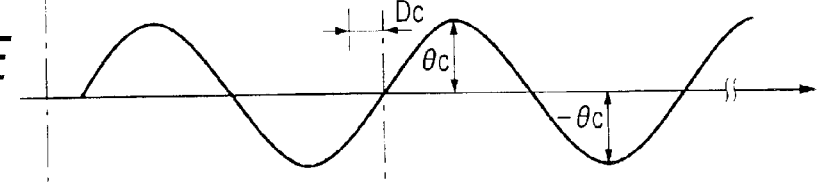
FIG. 6F
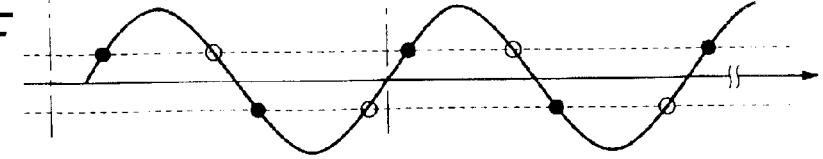

LIGHT BEAM DEFLECTING APPARATUS, IMAGE FORMING APPARATUS UTILIZING THE SAME AND DRIVE METHOD THEREFOR

BACKGROUND OF THE INVENTION

1. Field of the Invention

The present invention relates to a light beam deflecting apparatus (hereinafter a light beam deflecting device, a drive unit and a control unit therefor being collectively called a light beam deflecting apparatus or a light beam deflecting unit), and an image forming apparatus, and more particularly to a light beam deflecting unit and an image forming apparatus such as a laser display, a laser printer or a scanner.

2. Related Background Art

There is conventionally known a light beam deflecting scanning apparatus for deflecting a light beam, emitted from a light source such as a laser, by a light beam deflecting device such as a polygon mirror or a galvanometer to scan a screen or an exposure surface. The polygon mirror is a deflecting device in which plural mirrors constituting a polygon are rotated by a periodical drive signal to effect light beam scanning in one direction on the screen. The gavanometer causes a vibrational reciprocating motion to a mirror surface under the application of a periodical drive signal to generate reciprocating light beam scanning on the screen. It is naturally possible also to utilize the scanning of one direction only by partially turning off the light beam.

For driving the galvanometer, there is known electrostatic drive, electromagnetic drive or drive utilizing piezo effect. The wave form of vibration is generally sinusoidal, but vibration of triangular wave or saw tooth wave is also possible by suitably selecting the wave form of the driving voltage. In case the galvanometer has an intrinsic vibration, a drive signal of a matching frequency can be given to generate resonance thereby causing the vibration of maximum amplitude with a minimum electric power.

There is proposed a projection image display apparatus utilizing such light beam detecting device for projecting an image such as of television onto a screen. In such image forming apparatus, there is known an apparatus provided with a light beam detecting device for executing horizontal and vertical scans with a laser light beam emitted from a laser light source such as LD, by resonant drive of two galvano mirrors.

In such image display apparatus utilizing the light beam deflecting device, there is generally involved a difference between the periodical drive signal applied to the deflecting device and the actual rotational or reciprocating rotational movement in the deflecting device or the periodical scanning motion of the light spot on the screen, as will be explained in the following.

FIGS. 10A to 10E shows the relationship in time of the drive voltage applied to the galvanometer and the position of the actual light spot on the screen. FIG. 10A shows the change in time of the drive voltage applied to the galvanometer, and FIGS. 10B to 10E show the changes in time of the position of the light spot on the screen. FIG. 10B shows a standard response, while FIG. 10C shows a case where the phase is shifted, FIG. 10D shows a case where the amplitude is changed, and FIG. 10E shows a case where the center position is shifted. In practice, these states may appear in mixed manner.

Such shift in the phase, amplitude or central position principally results from a fluctuation in the characteristics of the galvanometer, a variation in the temperature, a variation in the position of the mirror and the light source, and a variation in the position of the mirror and the screen.

The vibration characteristics of the galvanometer vary depending on the dimension of the mirror and a torsion shaft supporting such mirror, and the distance between the drive electrodes or between the electromagnetic coils, but certain fluctuations in these factors are unavoidable in the manufacture, so that each galvanometer has delicate difference in the characteristics. For this reason, the response is different for the same voltage, whereby the maximum displacement angle, namely the amplitude and the phase, may shows a shift from the reference value.

In case of resonant vibration, a change in the temperature causes a change in the intrinsic vibration, which is therefore shifted from the frequency of the drive signal. The amplitude and the phase are shifted also by such factor. FIGS. 11A and 11B schematically show such phenomenon, wherein FIG. 11A shows the relationship between the drive frequency and the amplitude while FIG. 11B shows the relationship between the drive frequency and the phase. The maximum amplitude can be obtained if the drive frequency is at a state A matching the resonant point, but, if the resonance frequency is shifted to a state B, the amplitude decreases with a phase shift. The phase shift occurs in opposite directions depending on the direction of displacement, and the phase is delayed in case the resonance frequency changes to the higher side while it proceeds in case the resonance frequency changes to the lower side. If the relative position of the light source with respect to the screen changes in addition to the fluctuation in the characteristics of each mirror and the variation in temperature, the incident angle of the light beam into the mirror changes, whereby the center position of scanning on the screen is shifted. The center position is further shifted if the set position of the screen is shifted.

The foregoing explanation is based on a case of sinusoidal vibration, but the situation is similar also in other vibrations. In contrast, in case the deflecting device is constituted by a polygon mirror, the scanning amplitude does not vary in principle because the maximum displacement angle is determined by the number of the mirror faces, and the aforementioned change in the amplitude and phase by the temperature does not occur since the resonance is not utilized.

On the other hand, the light beam emitted from the light source is subjected to intensity modulation by the image signal and displays an image on the screen, and the start and end timings of such modulation are synchronized with the mirror drive signal in order to display the image in a predetermined area on the screen. However, if the relationship between the drive signal and the light spot on the screen is shifted from the reference state, there cannot be properly obtained a predetermined image on the screen. For example, if the light spot is caused to scan with a delay from the predetermined timing because of a phase shift as shown in FIG. 10C, the image is displayed in the upstream side of the predetermined position in the scanning. In case of one-dimensional scanning as in the polygon mirror, the image is merely displaced in the lateral direction and such displacement is permissible if it is slight, but, in case of reciprocating scanning, the image is shifted in opposite directions in the forward and backward scanning motions to generate doubled images, thus causing a fatal defect. Also a change in the amplitude or a change in the center position may cause, depending on the level thereof, a significant defect in the image.

In order to avoid such defect, it is necessary, in the actual display apparatus, to monitor the mode of vibration of the galvanometer or the movement of the light spot on the screen and to adjust the drive signal for the deflecting device or the modulation timing of the light beam. The following monitor methods have been proposed.

A galvanomirror disclosed in the Japanese Patent No. 2657769 is provided with a permanent magnet to superpose a high frequency wave with the drive current, and the displacement angle of the galvanomirror is detected from the change in the mutual inductance of between a drive coil on the galvanomirror and a detection coil opposed to the galvanomirror.

Also the Japanese Patent No. 3011144 discloses a method of measuring the rocking position of the galvanomirror by superposing an AC voltage of a small voltage and a high frequency with the drive voltage and detecting the current difference flowing in an electrode fixed to the electrode portion of the galvanomirror having a capacitor structure.

Also the Japanese Patent Application Laid-open No. 64-28535 discloses a method of measuring the rotational fluctuation or jitter of the mirror, from the difference in time of the detections in two positions of the light reflected from the polygon mirror.

The displacement angle sensor described in the Japanese Patent Nos. 2657769 and 3011144 has the advantage of being incorporated in the deflecting device and being capable of detecting the displacement of the galvanomirror over the entire period, but is therefore difficult to detect a small shift in the amplitude or in the phase. The detector is required to have a time resolution sufficient for determining the modulation start timing, but the change in the coil inductance or in the displacement current is very weak in the deflecting device executing a very small vibration, and the highly precise determination of the displacement angle is practically difficult, involving complication of the apparatus and an increased cost thereof.

On the other hand, the method disclosed in the Japanese Patent Application Laid-open No. 64-28535 is based on the detection of the light reflected by the polygon mirror and has a high precision of time measurement, but is associated with the following drawbacks in application to the sinusoidal vibration of the galvanomirror.

A sinusoidal vibration is uniquely defined by three parameters of amplitude A, phase $\delta$ and center position $X_0$ (period T being constant and defined as known). The change in time of the spot position X on the screen can be represented, with these parameters, by:

$$X = A\sin(2\pi t/T - \delta) + X_0.$$

These parameters vary by various factors as explained in the foregoing, but the spot position on the screen at an arbitrary time can be given if all these parameters are known.

If the parameters are determined and the foregoing equation is established, and in case of displaying an image within a range XA<X<XB wherein XA and XB are end positions of the image on the screen, there can be determined timings tA and tB respectively corresponding to XA and XB from the equations:

$$XA = A\sin(2\pi tA/T - \delta) + X_0 \text{ and}$$

$$XB = A\sin(2\pi tB/T - \delta) + X_0$$

and the modulation signal to be supplied to the light source can be so controlled as to initiate the modulation of the image signal at tA and to terminate the modulation at tB. As the reference of tA and tB, the timing can be suitably selected for a fixed signal having a period of vibration of the galvanomirror, but, in the following, the reference is taken at the rising edge of a signal synchronized with the drive signal for the galvanomirror.

In this manner, by automatically calculating the timing of modulation and executing the actual modulation based on such calculation, the image can always be displayed with a predetermined size and in a predetermined area even in the presence of any fluctuation in the characteristics of the deflecting device or of any shift in the positional relationship between the light source and the screen.

Then, let us consider the determination of the aforementioned three parameters.

At first, by obtaining measurement data:

$$X1 = A\sin(2\pi t1/T - \delta) + X_0$$

$$X2 = A\sin(2\pi t2/T - \delta) + X_0$$

by detecting the light in two positions on the screen, it will be evident that three unknown parameters A, $\delta$ and $X_0$ cannot be determined, so that it is necessary to detect the light in three or more positions.

Also, even if the third measurement data:

$$X3 = A\sin(2\pi t3/T - \delta) + X_0$$

by detecting the light in three positions, it is still not easy to determine the three unknown parameters A, $\delta$ and $X_0$ from these measurement data, because $\delta$ is included as a non-linear parameter. Such determination involves complex calculations and requires a calculation time. Particularly in case the aforementioned detection is executed in every scanning line, there is required high speed calculation not exceeding a line scanning time, and it is difficult to meet such requirement with a simple circuit.

Among the three parameters, $X_0$ can be easily adjusted by moving the position of the deflecting unit or the screen under the observation of an image projected by the light beam on the screen. In such case, the number of the unknown parameters is reduced to two, but the detector is still required in two positions and the complexity of calculation in determining $\delta$ still remains.

Also by calculating the difference of the aforementioned two data, there is obtained:

$$X1 - X2 = A\{\sin(2\pi t1/T - \delta) - \sin(2\pi t2/T - \delta)\}$$

which no longer contains $X_0$ but still contains two parameters A, $\delta$, so that the amplitude cannot be uniquely determined from the difference data.

On the other hand, in case of a polygon mirror, there can be obtained a relationship:

$$X = A(t/T - \delta) + X_0$$

since the change in time of the spot position on the screen is linear after correction with an f$\theta$ lens. Though this relation still contains three parameters, namely amplitude A, phase $\delta$ and center position $X_0$, but the number of parameters is substantially two because the two parameters $\delta$ and $X_0$ are expressed in a form $-A\delta + X_0$. This is based on a situation that the change in phase and the change in center position appear as a shift in the image position and cannot be separated on the screen. Consequently, in such case, the unknown parameters can be eliminated from the measurement data in two positions:

$$X1 = A(t1/T - \delta) + X_0$$

$$X2 = A(t2/T - \delta) + X_0$$

and the positional change on the screen can be completely reproduced. More specifically, at first there is obtained the difference data:

$$X1-X1=(A/T)(t1-t2)$$

from which A/T is determined. Then it is substituted in the equation of T1 which is solved for $-A\delta+X_0$. Then this is substituted in the equation of X to obtain:

$$X=(X1-X2)/(t1-t2)\times(t-t1)+X1$$

As explained in the foregoing, since the galvanomirror is executing reciprocating motion, the timing detection method for the scanning light cannot be applied to the galvanomirror unlike the case of the conventional polygon mirror executing the one-directional scanning with a constant speed. Also since the scanning speed of the galvanomirror varies, the displacement angle is difficult to estimate except for the timing of detection, by mere detection of the timing of scanning. In case of employing a galvanomirror in a laser display or the like, the laser beam intensity is modulated by the image information while the light is put into the reciprocating scanning motion by the galvanomirror, but the estimation of the displacement angle at an arbitrary time is necessary in order to generate the start/end timing of modulation.

The object of the present invention is to resolve an issue that, in an image display apparatus employing an optical deflecting device executing non-linear scanning such as sinusoidal scanning, in case the relationship between the drive signal and the actual motion of the deflecting device or the relationship between the drive signal and the light beam scanning on the actual screen is shifted from a predetermined state by any reason, the conventional method of automatically detecting the motion of the deflecting device requires an increased number of detectors and there is required a complex and difficult calculation for determining the unknown parameters from the obtained data.

SUMMARY OF THE INVENTION

The above-mentioned object can be attained, according to the present invention, by a light beam deflecting apparatus provided with:

a light source for emitting a light beam;

modulation means for modulating the light beam emitting intensity of the light source;

modulation signal generation means for outputting a modulation signal to the modulation means;

a light beam deflecting device for deflecting the light beam emitted from the light source to conduct reciprocating scanning;

drive means for driving the light beam deflecting device;

drive signal generation means for outputting a drive signal of a predetermined period to the drive means; and measurement means for respectively measuring two times at which the light beam in reciprocating scanning motion passes a specified position on a scanning line in forward and backward motions; the apparatus comprising:

lag time data calculation means for calculating, from the measured values of two passing times in forward and backward motions, lag time data corresponding to a time lag of the forward and backward scannings of the deflecting device with respect to the drive signal for the deflecting device; and timing data calculation means for calculating, from the measured values of two passing times in forward and backward motions and the calculated lag time data, timing data corresponding to the modulation start or end time of the light beam within a scanning period;

wherein the modulation signal generation means outputs the modulation signal to the modulation means based on the calculated timing data.

BRIEF DESCRIPTION OF THE DRAWINGS

FIGS. 6A, 6B, 6C, 6D, 6D', 6E and 6F are charts showing various signals generated in the units shown in FIG. 5;

DESCRIPTION OF THE PREFERRED EMBODIMENTS

Now the present invention will be clarified in detail by embodiments thereof.

(Embodiment 1)

At first there is conceived a case where the scanning center position on the screen is easily correctable for example by adjusting the relative position and direction of the screen and the deflecting device under observation of an image. The adjustment is achieved by moving the screen or the deflecting apparatus.

In such case, assuming that there is no shift $X_0$ for the center position, the movement of the light spot on the screen cay be represented by:

$$X=A\sin(2\pi t/T-\delta)$$

and the movement of the light spot can be completely detected by determining the two unknown parameters A and $\delta$. Such case will be explained in the following as an embodiment 1.

Figure 1:
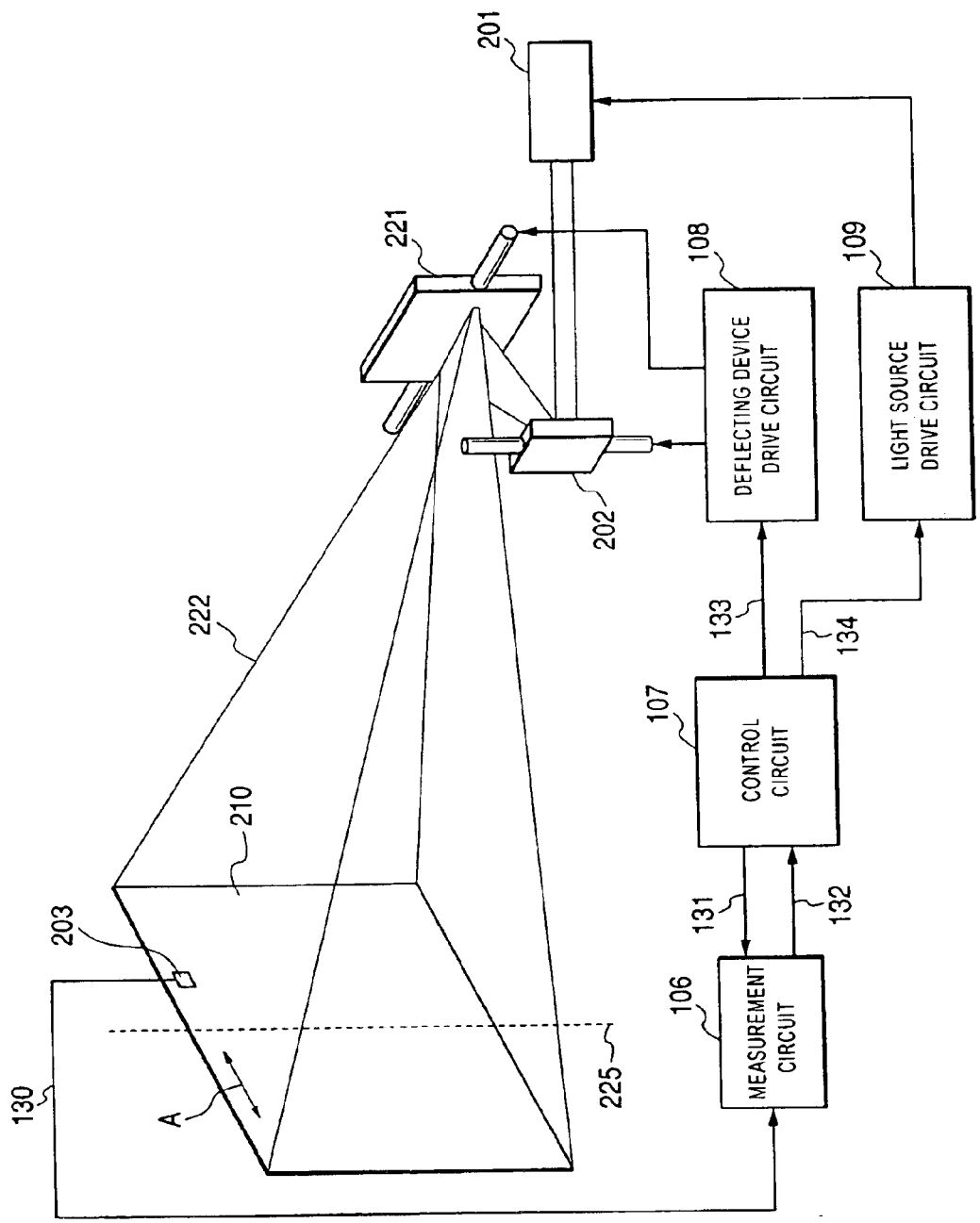
FIG. 1 is a schematic view showing the configuration of a light beam deflecting apparatus of the present invention and an image forming apparatus utilizing the same.

FIG. 1 shows the configuration of a light beam deflecting apparatus of the present embodiment.

FIG. 1 shows an example of a light beam deflecting apparatus for projecting a two-dimensional image on a screen by main scanning and sub scanning. The present light beam deflecting apparatus is composed of a light source 201, a main scanning galvanomirror 202 and a sub scanning galvanomirror 221 for scanning with the light from the light source 201, a photosensor 203 such as a photoelectric converting element for outputting an electric signal upon receiving the light 222 reflected by the galvanomirrors 202, 221, a measurement circuit 106 for measuring the passing time of the light through the sensor position, in response to the output of the photosensor, a control circuit 107 for acquiring information indicating the displacement angle of the main scanning galvanomirror 202 based on the result of measurement and also generating a synchronization signal synchronized with a drive signal applied to the main scanning galvanomirror 202 and a timing signal indicating the drawing start timing and drawing end timing of the light source 201, a deflecting device drive circuit 108, and a light source drive circuit 109.

The main scanning galvanomirror 202 executes reciprocating vibration to move the light spot in a direction A on a screen 210. The sub scanning galvanomirror 221 deflects the light in a direction perpendicular to the direction A.

The photosensor 203 is positioned in the vicinity of the upper end of the screen 210. This photosensor constitutes a timing sensor for generating a detection signal 130 at a timing when the light beam in a scanning motion in the main scanning direction (A) passes the position of the sensor 203. The detection signal 130 of the timing sensor 203 is supplied to the measurement circuit 106. The measurement circuit measures the time difference between a reference signal 131 from the control circuit 107 and the detection signal 130 by means of an internal counter (not shown), and sends a result 132 to the control circuit 107. The reference signal 131 is a clock signal generated in the control circuit 107 and defines the deflection period of the main scanning galvanomirror 202. A galvanomirror drive signal 133 synchronized therewith is also generated in the control circuit 107 and supplied to the drive circuit 108, which in response drives the galvanomirrors 202, 221 by applying AC voltages to the electrostatic electrodes thereof. Also in synchronization with the reference signal, a light source modulation signal 134 is generated at a predetermined timing in the control circuit and is supplied to the light source modulation circuit 109. The intensity of the light emitted from the light source is modulated by such modulation signal to form an image on the screen.

In the present embodiment, the timing sensor 203 generates a signal when the displacement angle of the main scanning galvanomirror 202 reaches a predetermined value, and it generates the detection signal at the timing of receiving the light spot in the movement of the light spot in both directions on the screen, namely both in the course of movement of the displacement angle of the galvanomirror 202 toward the maximum value and in the course of returning from such maximum value. Consequently, the timing signal (detection signal 130) is generated twice within a single cycle period. The phase of the displacement angle of the galvanomirror and the maximum displacement angle thereof are calculated from such output signal of the sensor, according to a method to be explained in the following.

Figure 3:
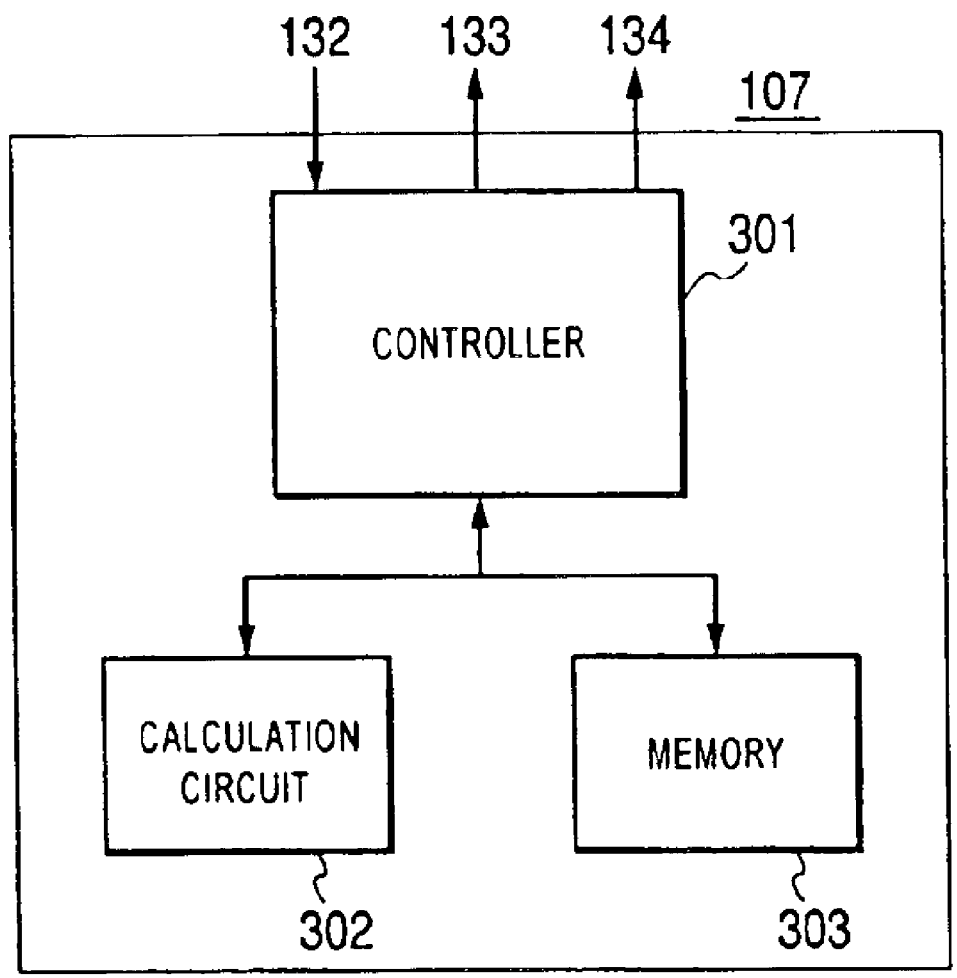
FIG. 3 is a block diagram showing the configuration of a control circuit shown in FIG. 1.

The timing sensor 203 may be provided at an arbitrary position other than a position corresponding to a zero displacement angle (indicated by a broken line 225 in FIG. 1) of the galvanometer, namely other than the center of scanning, but such position is set at a predetermined value in advance and is memorized in a memory in the control circuit (cf. FIG. 3).

In the present embodiment, since a sinusoidal drive signal is applied to the galvanomirror, the change of the displacement angle in time becomes symmetrical in the forward motion and in the backward motion. However, the wave form of the drive signal is not limited to sinusoidal but can also be triangular or saw tooth shape.

In the following there will be explained a case of resonant drive of the galvanomirror 202 by the application of a sinusoidal drive signal.

Figure 2:
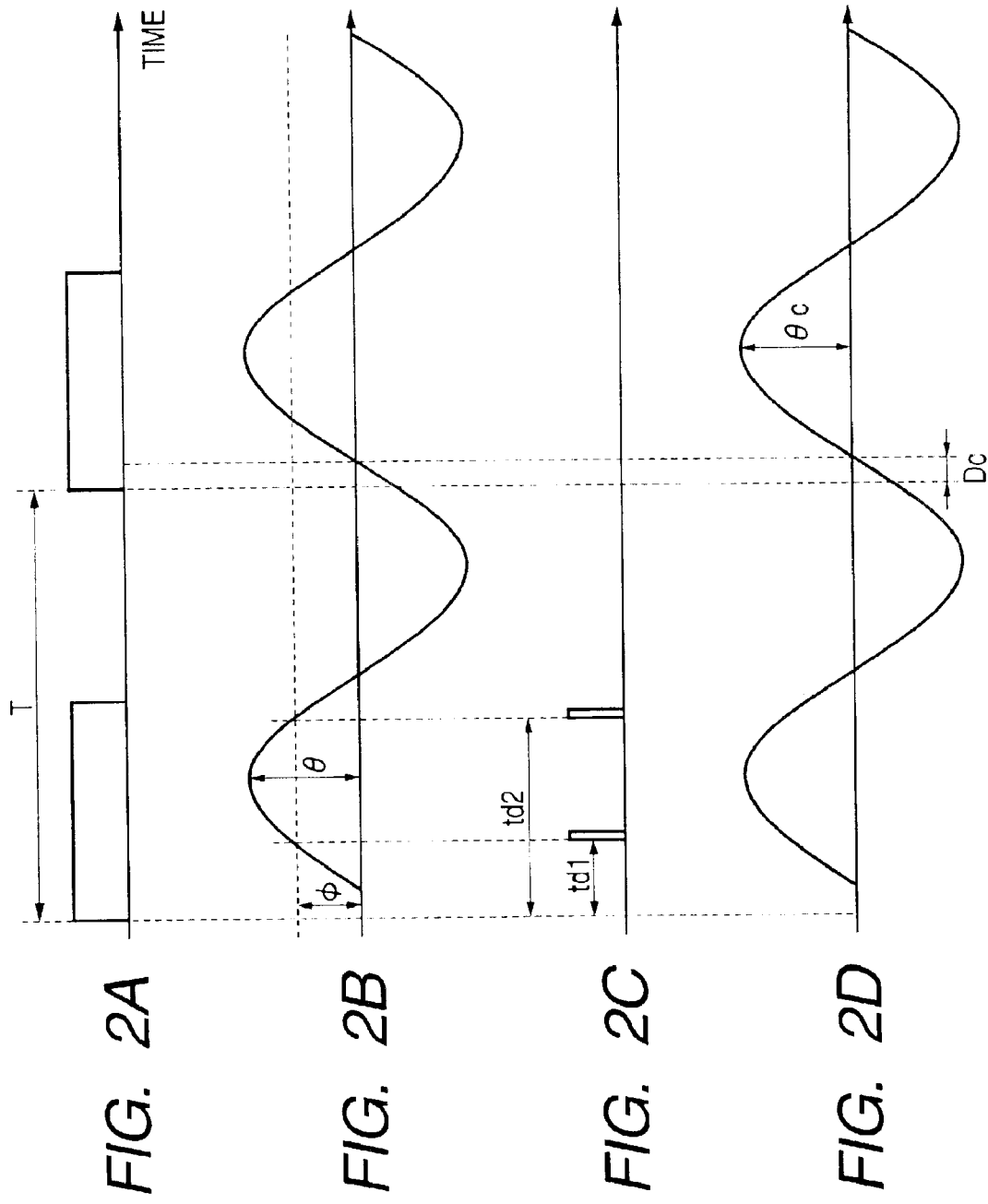
FIGS. 2A, 2B, 2C and 2D are charts showing various signals generated in the units shown in FIG. 1.

FIGS. 2A to 2D show various signals generated in the units shown in FIG. 1. FIG. 2A shows a reference signal synchronized with the clock signal of a clock generating circuit incorporated in the control circuit, FIG. 2B shows a response wave form of the galvanomirror when a drive voltage is applied thereto according to a drive signal (not shown) synchronized with the signal shown in FIG. 2A, FIG. 2C shows a detection signal of the photosensor, and FIG. 2D shows the change in time of the deflection angle of the galvanomirror, or the position of the light beam on the screen, calculated and reproduced by the following procedure.

In FIGS. 2A to 2D, $\phi$ indicates the displacement angle of the galvanomirror from the center point of drive to the position of the photosensor, $\theta$ indicates the displacement angle of the galvanomirror, $\pm\theta c$ indicates the maximum displacement angle of the galvanomirror, Dc indicates the time lag from the rising edge of the drive signal to the rising edge of the response wave form shown FIG. 2B, T indicates the cycle period of the signals in FIGS. 2A to 2D, and td1 and td2 indicate the time differences from the rising edge of the drive signal to the outputs of the respective timing signals.

The time lag Dc is generated in the resonance operation of the galvanomirror, in the drive system of the galvanomirror and in the electric system of the photosensor.

The photosensor 203 is so positioned, as shown in FIGS. 2A to 2D, as to generate the timing signal when the reflected light 222 from the galvanomirrors 202, 221 is shifted by the displacement angle $\phi$ from the center of rotation.

As the change of the displacement angle in time $\phi(t)$ is sinusoidal, it can be represented by:

$$\phi(t) = \Theta c \sin\{2\pi(t-Dc)/T\},$$

and the displacement angle $\phi$ of the sensor position and the two detection timings td1, td2 are correlated by:

$$\phi = \Theta c \sin\{2\pi(td1-Dc)/T\},$$

$$\phi = \Theta c \sin\{2\pi(td2-Dc)/T\}.$$

Therefore, based on the detection data $\phi$, td1 and td2, the time lag Dc and the maximum displacement angle $\Theta c$ can be respectively obtained from the following equations (1) and (2):

$$Dc = (1/4)(2td1 + 2td2 - T) \tag{1}$$

$$\Theta c = \phi/\sin\{(\pi/T)(td1 - td2 + T/2)\} \tag{2}$$

Depending upon which of td1 and td2 is the pulse in the forward path and the other is the pulse in the backward path, the value Dc calculated in the equation (1) may be different by T/2 from Dc defined in FIGS. 10A to 10E, namely the time from the rising edge of the drive signal in one direction to the rising edge of the deflecting device in the same direction. However such arbitrariness in the determination of Dc can be eliminated by displacing the position of the sensor in a predetermined direction from the center of scanning and judging whether the difference between td1 and td2 is larger than T/2 thereby determining which of td1 and td2 is the pulse in the forward path.

Also, if the sensor 203 is placed at the center position 225 of scanning, Θc cannot be determined in the equation (2) because φ=0. Also for this reason, the sensor has to be positioned outside the center of scanning.

The equation (1) is based on linear calculation of the measured times td1, td2 of passing of the sensor position and the scanning cycle period T. In the present case, since the wave form of vibration is symmetrical in the forward and backward paths, Dc can be calculated by the sum of the average of the two passing times and T/2. Such calculation can be achieved within a short time by a simple calculation circuit, without involving a complex process of solving a non-linear equation. The determination of Dc by such a simple calculation is made possible by detecting the scannings in forward and backward directions and employing the data of different times at the same position.

Such determination of two unknown parameters allows to know the wave form shown in FIG. 2D, namely the displacement angle of the deflecting device at an arbitrary time. Such result is used for calculating the start and end timings of modulation to be applied to the laser beam according to the image signal. More specifically, utilizing displacement angles φA and φB respectively corresponding to the image start and end positions, the start time tA and the end time tB can be given by:

$$tA = (T/2\pi)(\arcsin(\phi A/\Theta c) + Dc) \quad (3)$$

$$tB = (T/2\pi)(\arcsin(\phi B/\Theta c) + Dc) \quad (4).$$

The sine function in the equation (2) and the arcsine function in the equation (3) and (4) are well known and can be calculated within a short time by a calculating routine incorporated in the control circuit.

In the following, the function of the control circuit 107 will be explained with reference to FIG. 3, which is a block diagram showing the internal configuration of the control circuit. The control circuit is composed at least of a controller 301, a calculation circuit 302, and a memory 303.

The data on the scanning cycle period and on the sensor position are stored in advance in the memory 303.

When a detection pulse is generated from the timing sensor after the start of scanning, the measurement circuit measures the passing time and sends the result 132 to the control circuit 107. The controller 301 records the timing data, received from the measurement circuit, in the memory 303.

When the light beam completes a reciprocating cycle and the two timings are measured, the controller reads the data of the two passing times from the memory and sends them to the calculation circuit 302 for executing calculations corresponding to the equations (1) and (2), and records the result in the memory. In this calculation, the data on the scanning cycle period are also read from the memory and utilized.

Then the displacement angles φA, φB corresponding to the display start position and the display end position, stored in the memory 303 in advance, are read and used for calculating the modulation start timing tA and the modulation end timing tB according to the equations (3) and (4).

In a succeeding scanning operation, the light source modulation signal 134 is so controlled as to start the modulation corresponding to the image, at a timing after the lapse of the time tA and to end the modulation at a timing after the lapse of the time tB. More specifically, the controller 107 generates the galvanomirror drive signal 133 in synchronization with the reference signal and sends it to the galvanometer drive circuit, then generates a light source modulation start signal and sends it to the light source modulation circuit at a time delayed by tA, and generates and sends a light source modulation end signal to the light source modulation circuit at a time delayed by tB. Also between tA and tB, it reads the image data from the image memory and modulates such image data to generate the light source modulation signal for supply to the light source modulation circuit.

In the foregoing process, the intermediate data Dc and Θc may be simultaneously calculated in the course of calculation according to the equations (3) and (4).

Also, the calculation may be made by individually employing the detection signal generated in each cycle period, or by employing the average of the detection signals generated in plural cycle periods. The former method can be adopted in case of executing the detection of timing only in a part of the cycle period of the response wave form of the galvanomirror, and allows to reduce the time required until the drive signal for the galvanomirror is controlled. On the other hand, the latter method allows to improve the precision of detection, for example by accumulation and averaging of the data.

In the following there will be explained each unit of the present embodiment.

(Light Source 201)

The light source 201 is preferably capable of modulating the emitted light, for example a light source capable of direct modulation such as a gas or solid laser having a modulator, or a semiconductor laser or an LED. The modulation of the light source 201 can be achieved for example by pulse width modulation or intensity modulation, but the present embodiment has been explained by intensity modulation.

(Galvanomirror 202, 221)

The galvanomirror 202 or 221 can be composed of a galvanometer driven with a periodical driving wave form, a silicon microscanner prepared with a semiconductor process, or an actuator executing a rotary reciprocating motion about a rotary axis. The driving frequency can be arbitrarily selected as long as the galvanomirror 202 can be driven.

(Timing Sensor 203)

The timing sensor 203 can be of a light detecting system employing for example a beam detector, or can be integrated with the light beam deflecting unit.

In case the timing sensor 203 is composed of a light sensor or an electrostatic sensor prepared by a semiconductor process, it is possible to employ an optimum sensor at each displacement point, and the error in the position of the sensor is also determined by the error in the manufacturing process. There can therefore be obtained advantages that precise positioning of the sensor can be easily achieved and that compactization and cost reduction can be easily attained.

In case the galvanomirrors 202, 221 are produced by a semiconductor process, it is possible to mount the timing sensor 203 on a substrate same as or close to that of the galvanomirrors 202, 221, whereby there can be easily attained the integration of the light beam deflecting device and the highly precise positioning of the timing sensor and the galvanomirrors.

The calculation circuit 302 can be composed of a microcomputer, a DSP (digital signal processor) or a CPLD•FPGA (complex programmable logic device-field programmable gate array).

(Variation of Embodiment 1)

Figure 4A:
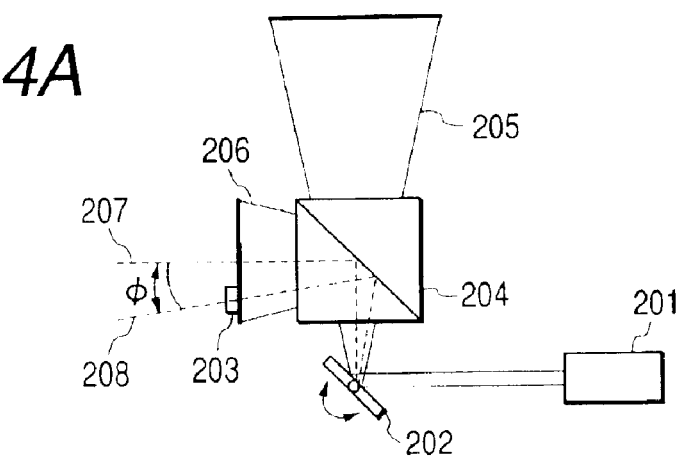
FIGS. 4A, 4B and 4C are views showing a variation of the image forming apparatus shown in FIG. 1.
Figure 4B:
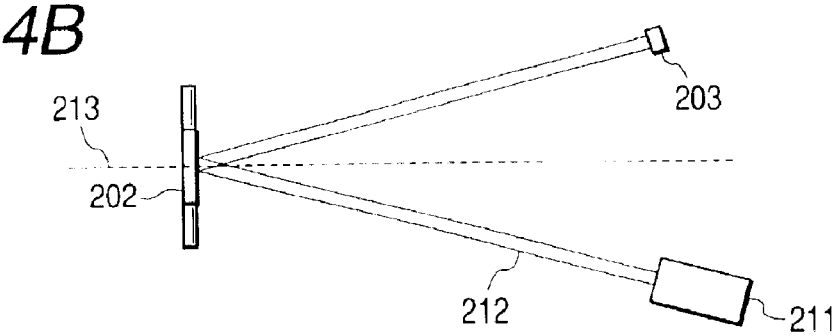
Figure 4C:
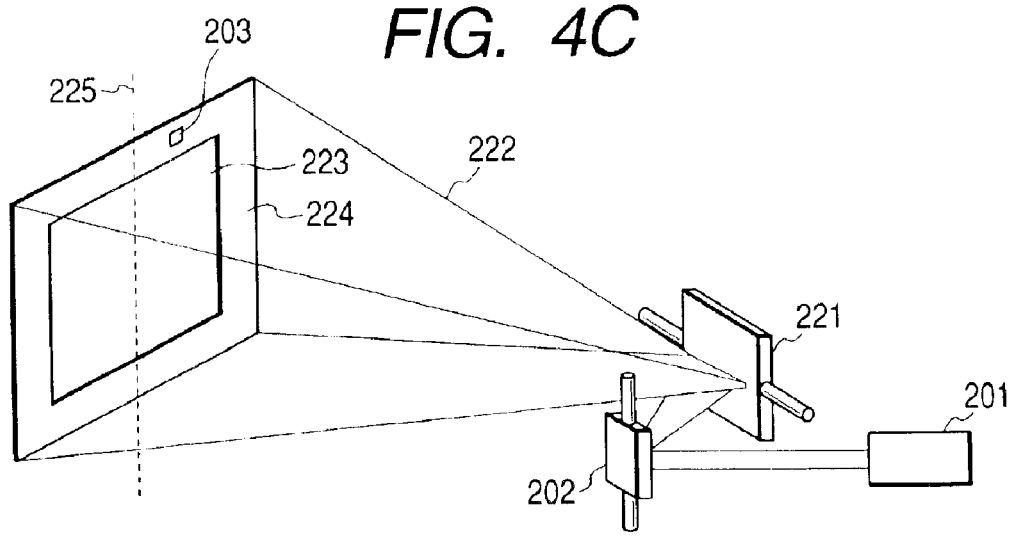

FIGS. 4A to 4C illustrate another example of the arrangement of the photosensor and the galvanomirror in the present embodiment. FIG. 4A shows a configuration in which, within the light emitted from the light source 201 and reflected by the galvanomirror 202, a light 206 separated by a beam splitter 204 is detected by the photosensor 203, thereby detecting that the reflected light 222 from the galvanomirror 202 reaches the predetermined displacement angle φ.

The timing sensor 203 is provided at a position 208 displaced by a predetermined angle φ from the center 207 of rotation. There is involved a decrease in the amount of the image drawing light 205 and there has to be prepared the beam splitter 204, but a separate light source for detection is unnecessary and the detection can be made over the entire scanning length. Also, since the split lights proceed in different directions, there can be avoided mutual interference and the reliability of detection can be improved.

FIG. 4B shows a configuration of employing a detecting light source 211 different from the light source, directing a light beam 212 from the detecting light source 211 to the galvanomirror 202 at an angle different from that of the light beam from the light source and detecting the reflected light from the galvanomirror 202 by the timing sensor 203. Numeral 213 indicates the center of rotation of the galvanomirror 202.

The use of the detecting light source 211 provides an advantage that the image drawing light does not decrease in comparison with the configuration shown in FIG. 4A.

FIG. 4C shows a configuration in which the timing sensor 203 is positioned in a non-image area 224, among the image area 223 and the non-image area 224 of a two-dimensional scanning system. In this configuration, the light beam from the light source 201 is reflected by the galvanomirror 202, and then reflected by a mirror 221 to constitute the image drawing light beam 222. 225 indicates the center of rotation of the galvanomirror 202. This configuration is defective in that the detection is made only in a part of the scanning, but is advantageous in not requiring new components.

In the configurations shown in FIGS. 4A to 4C, the scanning light is detected by the photosensor 203 in a position separate from the galvanomirror 202, but it is also possible to integrate a compact galvanomirror 202 and the photosensor 203 by a semiconductor process.

The timing sensor is not limited to a photosensor 203 but can also be composed of an electrostatic sensor or a magnetic sensor such as a coil, but the timing sensor is not of a type generating the detection signal over the entire period of vibration of the galvanometer but a type generating a sharp detection signal at a specified displacement angle, as explained in the aforementioned Japanese Patent Nos. 2657769 and 3011144.

(Embodiment 2)

In the following there will be explained an embodiment 2 of the present invention.

A second situation of the present invention assumes that the center position of scanning of the deflecting device has an unknown shift, and that the mutual position and direction of the screen and the deflecting device are not easily changeable. Such situation arises for example when the screen and the deflecting device are both fixed on the walls of a room. In such case, by representing the movement of the light spot on the screen, including the shift $X_0$ of the center position, by:

$$X = A\ \sin(2\pi t/T - \delta) + X_0$$

and by determining three parameters A, δ and $X_0$, there can be completely understood the movement of the light spot. Such case will be explained in the following as an embodiment 2.

In the following the embodiment 2 will be explained with reference to the accompanying drawings.

Figure 5:
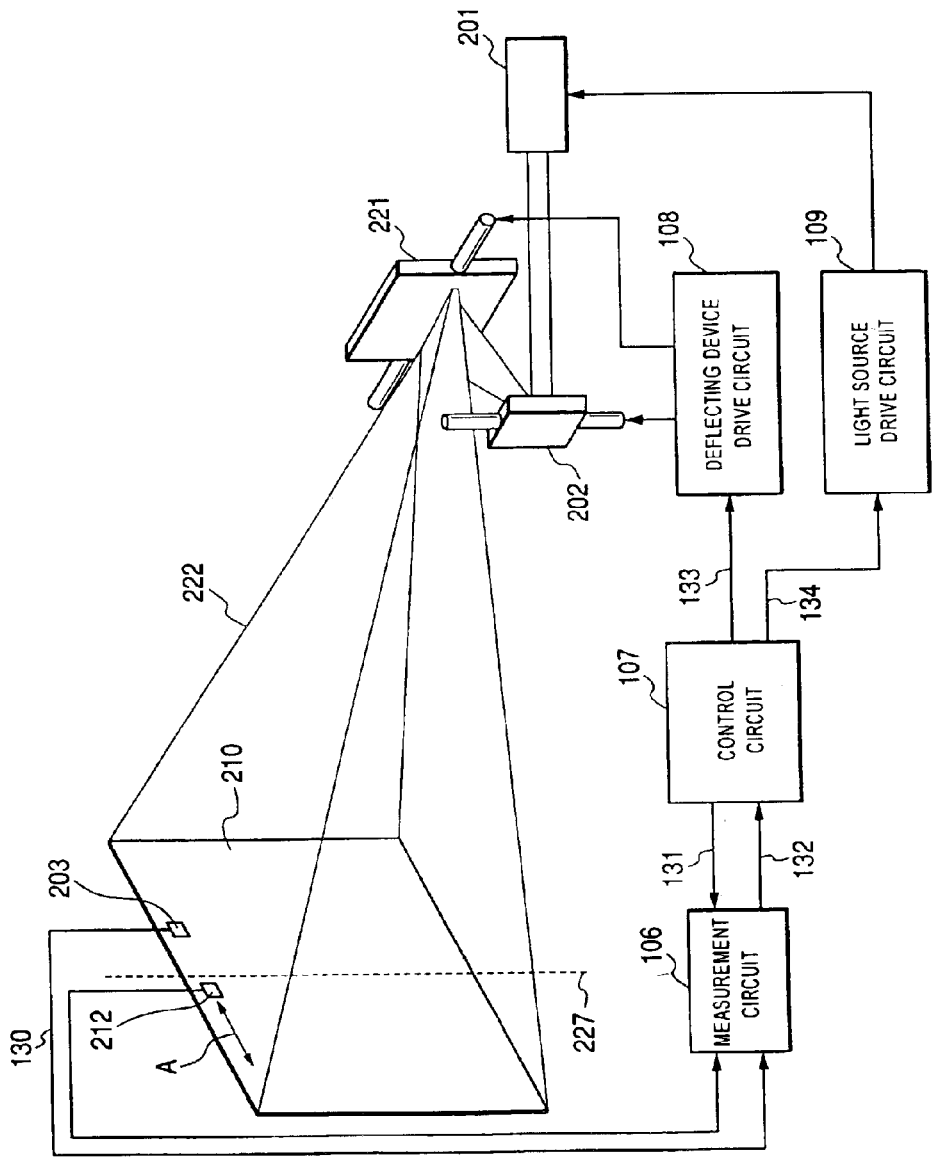
FIG. 5 is a schematic view showing the configuration of another light beam deflecting apparatus of the present invention and an image forming apparatus utilizing the same.

FIG. 5 is a schematic view showing the configuration of a light beam deflecting unit of the present embodiment, wherein components equivalent to those in FIG. 1 are represented by corresponding numbers.

In contrast to the configuration shown in FIG. 1, timing sensors 203, 212 are provided in two positions at the upper end of the screen. At least one of the sensors detects the timing of the scanning beam in the forward and backward motions, but the other sensor may detect the timing only in the forward or backward motion.

FIGS. 6A to 6F shows a method for generating the drive signal for the main scanning galvanomirror 202 shown in FIG. 5.

FIG. 6A shows a synchronization signal for a drive signal; FIG. 6B shows a drive signal to be applied to the galvanomirror 202 in synchronization with the reference signal shown in FIG. 6A; FIG. 6C shows a displacement wave form of the galvanomirror 202 actually driven according to the drive signal shown in FIG. 6B; FIGS. 6D and 6D' respectively show the output signals of the photosensors 203 and 212; FIG. 6E shows the wave form of displacement of the galvanomirror 202 reproduced from the output signal shown in FIGS. 6D and 6D'; and FIG. 6F shows the drawing start/end timing based on the displacement wave form shown in FIG. 6E.

In FIG. 6C, φ1, φ2 indicate the displacement angles of the galvanomirror 202 from the center point of drive to the positions of the photosensors 203, 212, ±Θc indicates the maximum displacement angle of the galvanomirror 202, Dc indicates the time lag from the rising edge of the drive signal shown in FIG. 6A to the rising edge of the displacement wave form shown in FIG. 6B, and T indicates the cycle period of the displacement wave form shown in FIG. 6B. The time lag Dc is generated in the drive system of the galvanomirror 202 and in the electrical systems of the photosensors 203, 212.

When a drive signal A1 shown in FIG. 6B is applied to the galvanomirror 202 in synchronization with the reference signal shown in FIG. 6A, the galvanomirror 202 starts to rotate in response to such drive signal after a time lag Dc, thereby providing a sinusoidal displacement wave form shown in FIG. 6C.

After a time td1 from the start of application of the drive signal A1, the reflected light 222 from the vertical scanning mirror 221 enters the photosensor 203, which in response outputs a detection signal C1 as shown in FIG. 6D.

Along with further drive of the galvanomirror 202, the reflected light 222 then reaches a displacement angle Θ corresponding to the peak of sinusoidal wave form, and, after the lapse of a time td2 from the start of application of the drive signal A1, the reflected light 222 again enters the photosensor 203, which in response outputs a detection signal C2.

Then the galvanomirror 202 returns to the zero displacement angle and is further rotated to a negative displacement angle, and, after the lapse of a time td3 from the start of application of the drive signal, the reflected light 222 enters the photosensor 212 which in response outputs a detection signal C3 as shown in FIG. 6D'. Thereafter the galvanomirror reaches a displacement angle −Θ.

Then, after the lapse of a time td4 from the start of application of the drive signal, the reflected light 222 again enters the photosensor 212 which in response outputs a detection signal C4 as shown in FIG. 6D'. Thereafter the galvanomirror returns to the zero displacement angle.

Assuming that the displacement of the galvanomirror is sinusoidal, as represented by:

$$\phi(t) = \Theta c \sin\{2\pi(t-Dc)/T\} + \phi_0,$$

there stand following relations among the displacement angles φ1, φ2 and the above-mentioned four detection timings td1 to td4:

$$\phi 1 = \Theta c \sin\{2\pi(td1-Dc)/T\} + \phi_0$$

$$\phi 1 = \Theta c \sin\{2\pi(td2-Dc)/T\} + \phi_0$$

$$-\phi 2 = \Theta c \sin\{2\pi(td3-Dc)/T\} + \phi_0 \text{ and}$$

$$-\phi 2 = \Theta c \sin\{2\pi(td4-Dc)/T\} + \phi_0.$$

Then, when the drive signal A2 is applied to the galvanomirror 202, the detection signals are supplied to the measurement circuit 106 as explained in the foregoing process, where detection signal C5 is the first detection signal for drive signal A2. In this manner, the measurement circuit 106 receives four detection pulses C1 to C4 corresponding to the displacement of the galvanomirror 202 in a single cycle period T.

As in the embodiment 1, the time lag Dc is determined from the times td1, td2 by the following equation (5):

$$Dc = (1/4)(2td1 + 2td2 - T) \tag{5}$$

Otherwise, the time lag Dc may be determined from the times td3, td4 by the following equation (6):

$$Dc = (1/4)(2td3 + 2td4 - 3T) \tag{6}$$

As Dc can be determined in this manner, the amplitude Θc and the center position $\phi_0$ can be determined by solving simultaneous first-order equations constituted by the foregoing equations of φ1 and φ2 as follows:

$$\Theta c = (\phi 1 + \phi 2)/[\sin\{(\pi/T)(td1-td2+T/2)\} + \sin\{(\pi/T)(td3-td4+T/2)\}] \tag{7) and}$$

$$\phi_0 = [\phi 1 \cdot \sin\{(\pi/T)(td3-td4+T/2)\} - \phi 2 \cdot \sin\{(\pi/T)(td1-td2+T/2)\}]/[\sin\{(\pi/T)(td1-td2+T/2)\} + \sin\{(\pi/T)(td3-td4+T/2)\}] \tag{8}$$

As will be apparent from the equations (5) and (6), td1 to td4 are not independent but have a relationship:

$$-td1 - td2 + td3 + td4 = T$$

The equation (5) for determining Dc has arbitrariness on T/2 according to which of td1 and td2 is the pulse in the forward path and the other is the pulse in the backward path, but such arbitrariness can be eliminated by shifting the sensor position from the center of scanning and taking a pulse of a shorter distance as td1, thereby establishing the pulse in the forward path and that in the backward path. A similar situation applies to the equation (6).

The equations (5) and (6) are based on linear calculation of the measured times td1 to td4 of passing of the sensor positions and the scanning cycle period T. In the present case, since the wave form of vibration is symmetrical in the forward and backward paths, Dc can be calculated by the sum of the average of the two passing times and T/2. Such calculation can be achieved within a short time by a simple calculation circuit, without involving a complex process of solving a non-linear equation. The determination of Dc by such a simple calculation is made possible by detecting the scannings in forward and backward directions in at least a photosensor and employing the data of different times at the same position.

Such determination of three unknown parameters allows to know the displacement angle of the deflecting device at an arbitrary time. Such result is used for calculating the start and end timings of modulation to be applied to the laser beam according to the image signal by the following equations, as in the foregoing embodiment 1:

$$tA = (T/2\pi)(\arcsin(\phi A - \phi_0)/\Theta c) + Dc) \tag{3}$$

$$tB = (T/2\pi)(\arcsin(\phi B - \phi_0)/\Theta c) + Dc) \tag{4}.$$

In FIG. 6F, the start position of drawing and the timing thereof are indicated by ○, and the end position of drawing and the timing thereof are indicated by ●. The start and end of the drawing are preferably made in an area where the galvanomirror shows a small change in the velocity.

In the present embodiment, the position data φ1, φ2 of the 1st and 2nd sensors and the displacement angle data φA, φB indicating the range of image display are defined as distances from the reference position on the display screen, assuming that the center of scanning coincides with the reference position 227 of the screen (for example the center of the screen).

Figure 7:
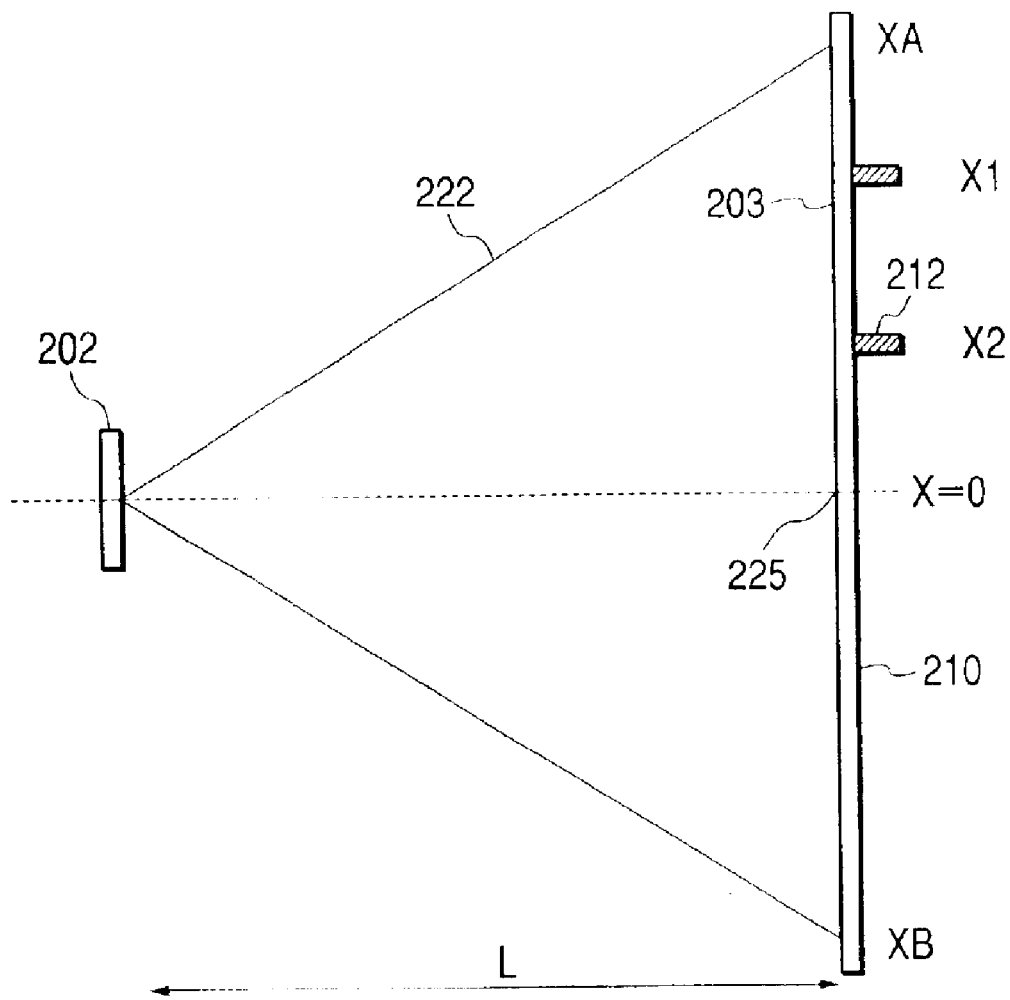
FIG. 7 is a schematic view showing the positional relationship between a screen and a galvanomirror.

FIG. 7 shows the positional relationship of the main scanning deflecting device 202 and the screen 210, wherein the 1st and 2nd sensors 203, 212 are positioned on the screen 210 and the image display range is defined as XA<X<XB. L indicates the distance from the main scanning deflecting device to the screen, and a sub scanning galvanomirror is positioned within this distance.

For a distance X1 (or X2) of the 1st (or 2nd) photosensor from the center of the screen, φ1 (or φ2) can be defined by:

$$\phi 1 = \arctan(X1/L)$$

$$\phi 2 = \arctan(X2/L).$$

Similarly the distance XA (or XB) from the left (or right) end of the image display area to the center of the screen can be defined by:

$$\phi A = \arctan(XA/L)$$

$$\phi B = \arctan(XB/L).$$

In the present embodiment, even if the center of scanning is shifted from the reference position of the screen, there is determined the offset value of the center of scanning as explained in the foregoing and the start and end timings of modulation are determined based on such offset value, so that the image positions XA, XB are not shifted on the screen.

The foregoing equation (7) includes φ1 and φ2 in the form of a summation φ1+φ2. This indicates that the amplitude is determined by the relative position of the two detectors. Stated differently, the time lag Dc and the amplitude Θc can be determined irrespective of the positions of the detectors on the screen, as long as the mutual distance thereof is fixed. If the detectors are shifted on the screen while maintaining the mutual distance thereof, $\phi_0$ in the equation (8) varies to shift the image to the left or to the right on the screen, but it is easy to adjust the positions of the detectors to the correct positions. Therefore, the image can always be projected on a predetermined position on the screen, even under a situation where it is difficult to change the positional relationship of the deflecting apparatus and the screen.

Also in case the detectors are not positioned on the screen but are provided in the deflecting apparatus, the position of the image area on the screen can be similarly adjusted by regulating the positions of the detectors while retaining the distance thereof.

In the present embodiment, as explained in the foregoing, the photosensors are only required to have a defined mutual distance and the positional relationship between each photosensor and the center point of drive of the galvanomirror is not strictly defined, so that the assembling cost of the light beam deflecting unit can be reduced.

The control circuit in the present embodiment can be the same as that of the embodiment 1 shown in FIG. 3.

In the following there will be explained the function of the control apparatus 107.

The scanning cycle period data T, the position data $\phi 1$, $\phi 2$ and the displacement angle data $\phi A$, $\phi B$ are stored in the memory in advance.

After the start of the reference signal, the control apparatus confirms that four passing time data of the scanning beam, from the measurement circuit, are transmitted in succession, and stores these data in the memory. If the second sensor only detects the forward or backward scan, there are employed three passing time data. Also even in case four time data are transmitted, the control circuit may confirm and store the first three data only.

Then these data are transmitted, together with the scanning cycle period data T and the sensor position data $\phi 1$, $\phi 2$, to the calculation circuit, which calculates Dc by the equation (5) or (6) and $\Theta c$ and $\phi_0$ by the equations (7) and (8) and returns the results to the control circuit. The control circuit stores these results in the memory.

Then the control circuit transfers the displacement angle data $\phi A$, $\phi B$, determined from the image display area and stored in advance, the scanning cycle period data T, and the time lag data Dc, amplitude data $\Theta c$ and center position offset data $\phi_0$ calculated as explained above, to the calculation circuit, thereby calculating tA and tB by the equation (9) and (10) and storing the results in the memory.

In a succeeding scanning operation, the light source modulation signal is so controlled as to start the modulation corresponding to the image, at a timing after the lapse of the time tA and to end the modulation at a timing after the lapse of the time tB. More specifically, the controller generates the galvanomirror drive signal in synchronization with the reference signal and sends it to the galvanometer drive circuit, then generates a light source modulation start signal and sends it to the light source modulation circuit at a time delayed by tA, and generates and sends a light source modulation end signal to the light source modulation circuit at a time delayed by tB. Also between tA and tB, it reads the image data from the image memory and modulates such image data to generate the light source modulation signal for supply to the light source modulation circuit.

In case the position data of the two sensors are not given individually but only given by relative position data (relative displacement angle data) $\phi 1+\phi 2$, the calculation according to the equations (9) and (10) is executed on an assumption $\phi_0=0$. If the image display area on the screen is shifted from the predetermined position as a result, $\phi_0$ is adjusted for example with a dial under the observation of the displayed image, and the calculation of the equations (9) and (10) is executed again with thus adjusted value of $\phi_0$, thereby adjusting the image to the desired position.

As explained in the embodiment 1, the calculations utilizing the equations (5) to (10) may be executed for each entry of electrical signals for every cycle period, or for every several cycle periods. A signal processing system capable of executing the aforementioned calculations within a cycle period, if provided in the control circuit 107. is preferable for achieving faster control.

The light source, galvanomirrors and timing sensors shown in FIG. 5 can be the same as those employed in the embodiment 1. Also the control means can be similarly composed of a microcomputer, a DSP (digital signal processor) or a CPLD•FPGA (complex programmable logic device—field programmable gate array).

In case the timing sensors 203, 212 are composed of light sensors or electrostatic sensors prepared by a semiconductor process, it is possible to employ an optimum sensor at each displacement point, and the error in the position of the sensor is also determined by the error in the manufacturing process. There can therefore be obtained advantages that precise positioning of the sensor can be easily achieved and that compactization and cost reduction can be easily attained.

In case the galvanomirrors 202, 221 are produced by a semiconductor process, it is possible to mount the timing sensors 203, 212 on a substrate same as or close to that of the galvanomirrors, whereby there can be easily attained the integration of the light beam deflecting device and the highly precise positioning of the timing sensors and the galvanomirrors.

(Variations of Embodiment 2)

As in the embodiment 1, there can be conceived certain variations in the detection system.

Figure 8:
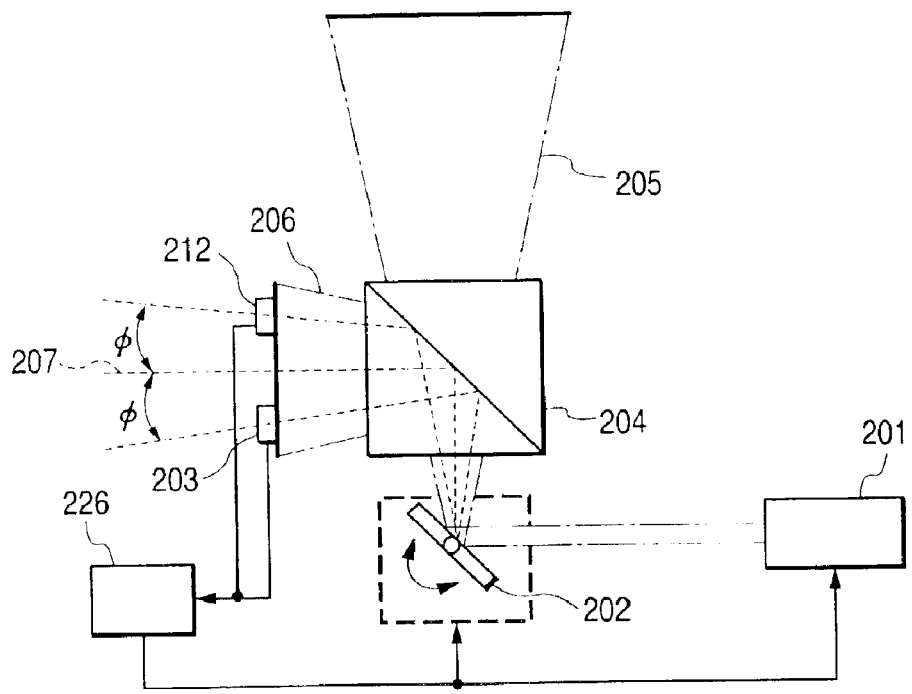
FIGS. 8 and 9 are views showing variations of the image forming apparatus shown in FIG. 5.

At first, FIG. 8 shows a configuration in which the light reflected by the galvanomirror 202 is separated by a beam splitter, and such split light is detected by a light beam detector or the like.

In this method, since the split lights proceed in different directions, there can be avoided mutual interference and the reliability of detection can be improved.

Figure 9:
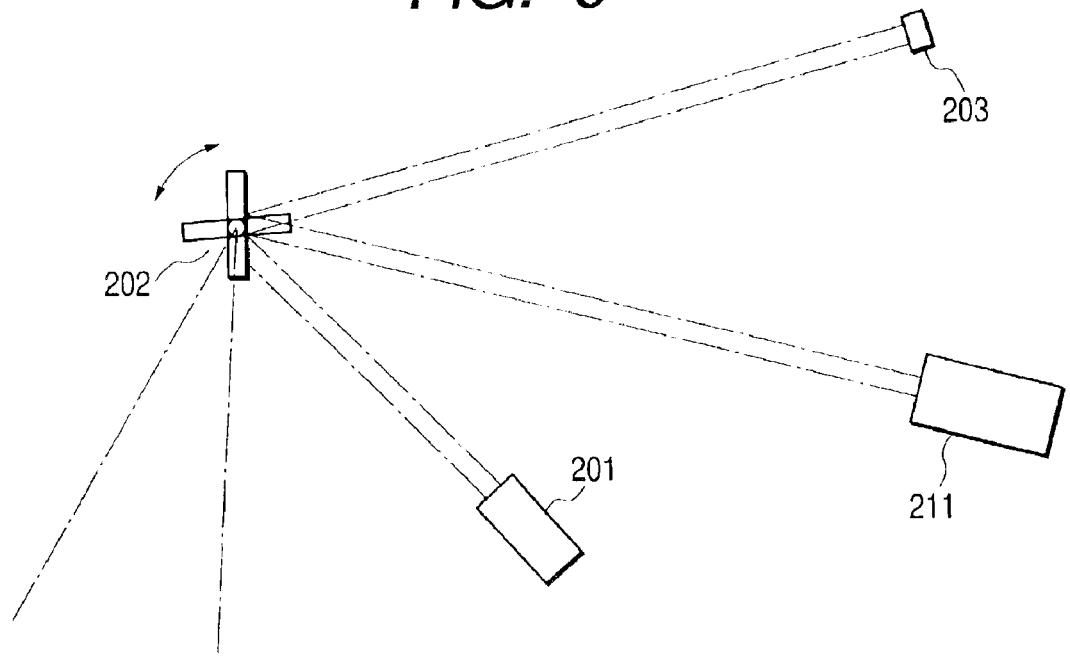
Figure 10A:
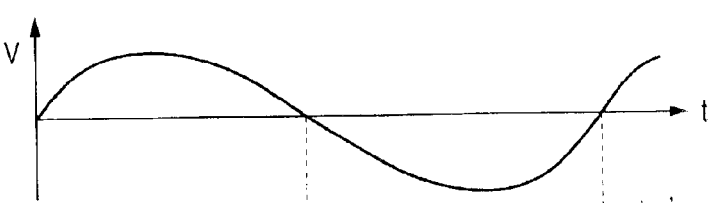
FIGS. 10A, 10B, 10C, 10D and 10E are charts showing the relationship of vibration with respect to the drive signal for the light beam deflecting device.
Figure 10B:
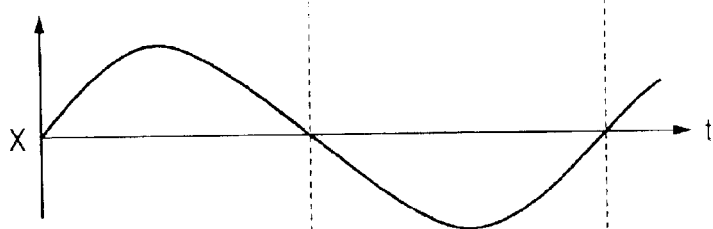
Figure 10C:
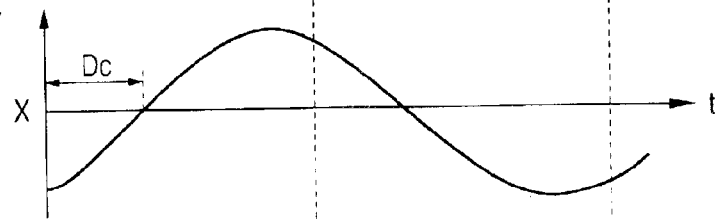
Figure 10D:
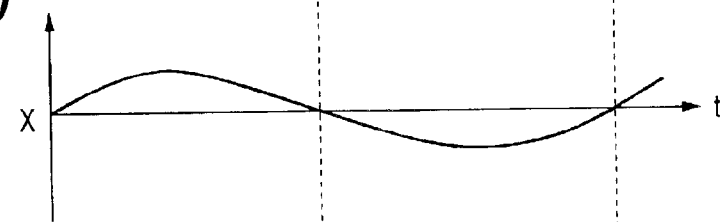
Figure 10E:
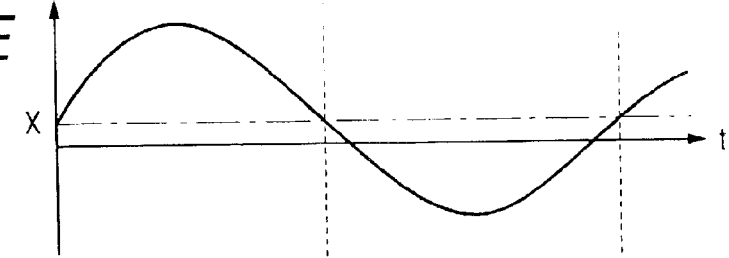

FIG. 9 shows a configuration of employing a detecting light source 211 for emitting a separate detecting light beam in addition to the main light source 201 for image display, directing a light beam to the galvanomirror 202 at an angle different from that of the light beam from the light source 201 and detecting the light beam by the timing sensor 203 (which may be provided in two units but is assumed to be in one unit in the following description). The beam of the main light source is not detected.

In such configuration, the sensor 203 may be positioned outside the display area on the screen, or within the apparatus, and can therefore be prevented from disturbing the observation of the displayed image. Also the use of the separate detecting light source allows to avoid a drawback that, in case of detecting the main light source, the detection becomes impossible by coincidence by the fact that the image under modulation becomes weak or almost zero at the sensor position.

The electric power consumption of the detecting light source can be reduced by emitting the detecting light only in a part of the sub scanning time of the main light source, namely in a period in which the main scanning runs over the sensor, and turning off the detecting light beam in other periods. There is also provided an advantage that the light of a luminance, an intensity and a spot size sufficient for detection can be emitted from the detecting light source, even in case the sensitivity of the sensor is poor and the light from the main light source is insufficient in intensity.

The use of the detecting light source 211 as shown in FIG. 9 allows to increase the image luminance in relative manner, since the light projection amount onto the screen is not lowered in comparison with the configuration shown in FIG. 8. It is also easy to optimize the size of the detecting light beam or the arrangement of the photosensors, thereby enabling to acquire information providing a highly precise displacement angle.

Figure 12:
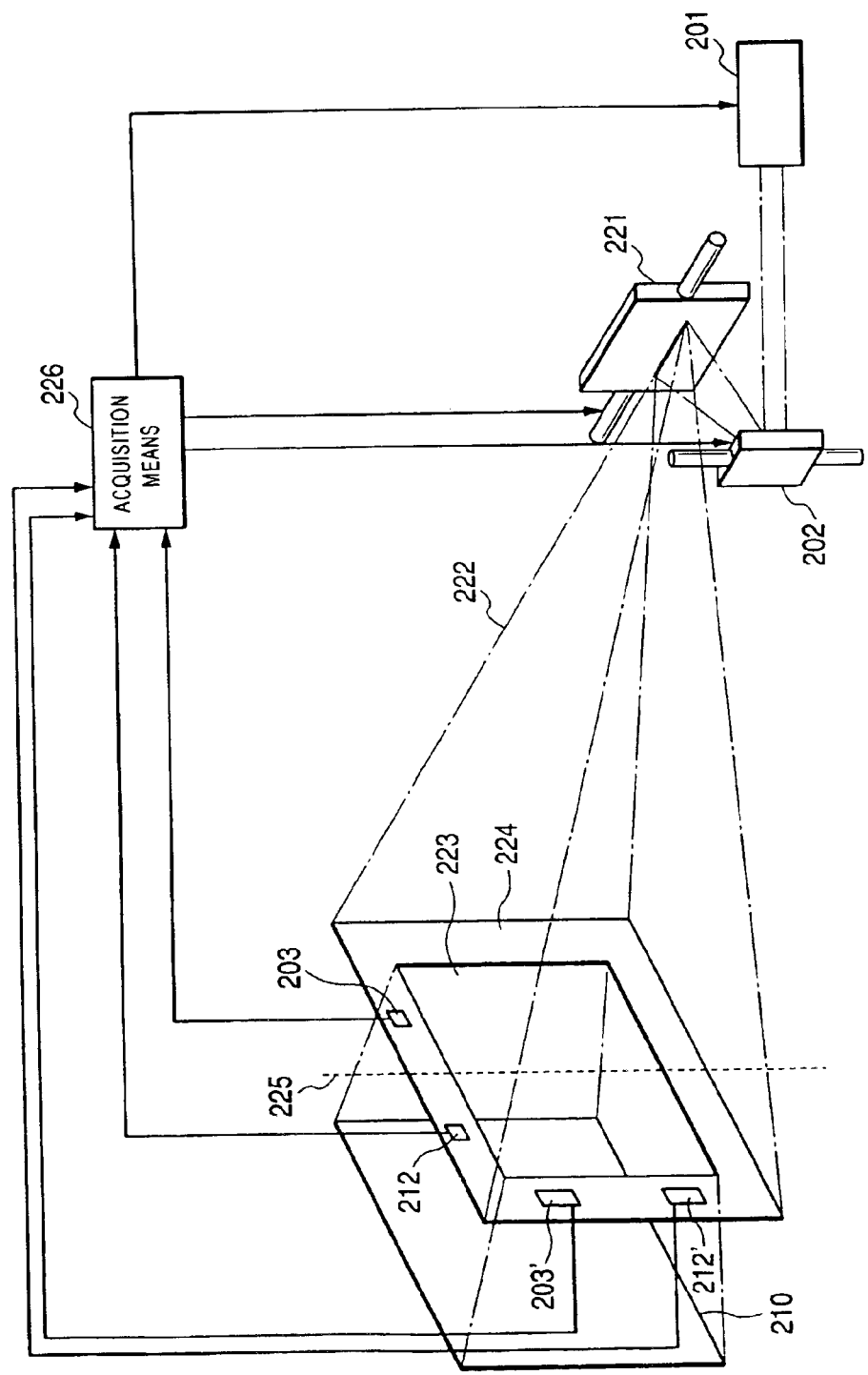
FIG. 12 is a view showing a variation of the image forming apparatus shown in FIG. 5.

FIG. 12 shows still another variation in which the sub scanning operation is executed also in a non-imaging area in which the timing sensors 203, 212 are positioned, and the light is emitted from the light source 201 at such moments that the reflected from the galvanomirror 202 enters the timing sensors 203, 212. There can be prevented the drawbacks of loss in luminance or interference, because there are not required a beam splitter or a detecting light source.

The plane 223 on which the timing sensors 203, 212 shown in FIG. 12 are positioned need not necessarily be the projection plane. The plane 223 of the timing sensors may be provided in the projection apparatus to provide a projection apparatus in which the projection plane can be arbitrarily selected.

In the following, the present invention will be further clarified by examples thereof. These examples have a configuration with two photosensors, but there may also be adopted a configuration with a photosensor.

EXAMPLE 1

Figure 13:
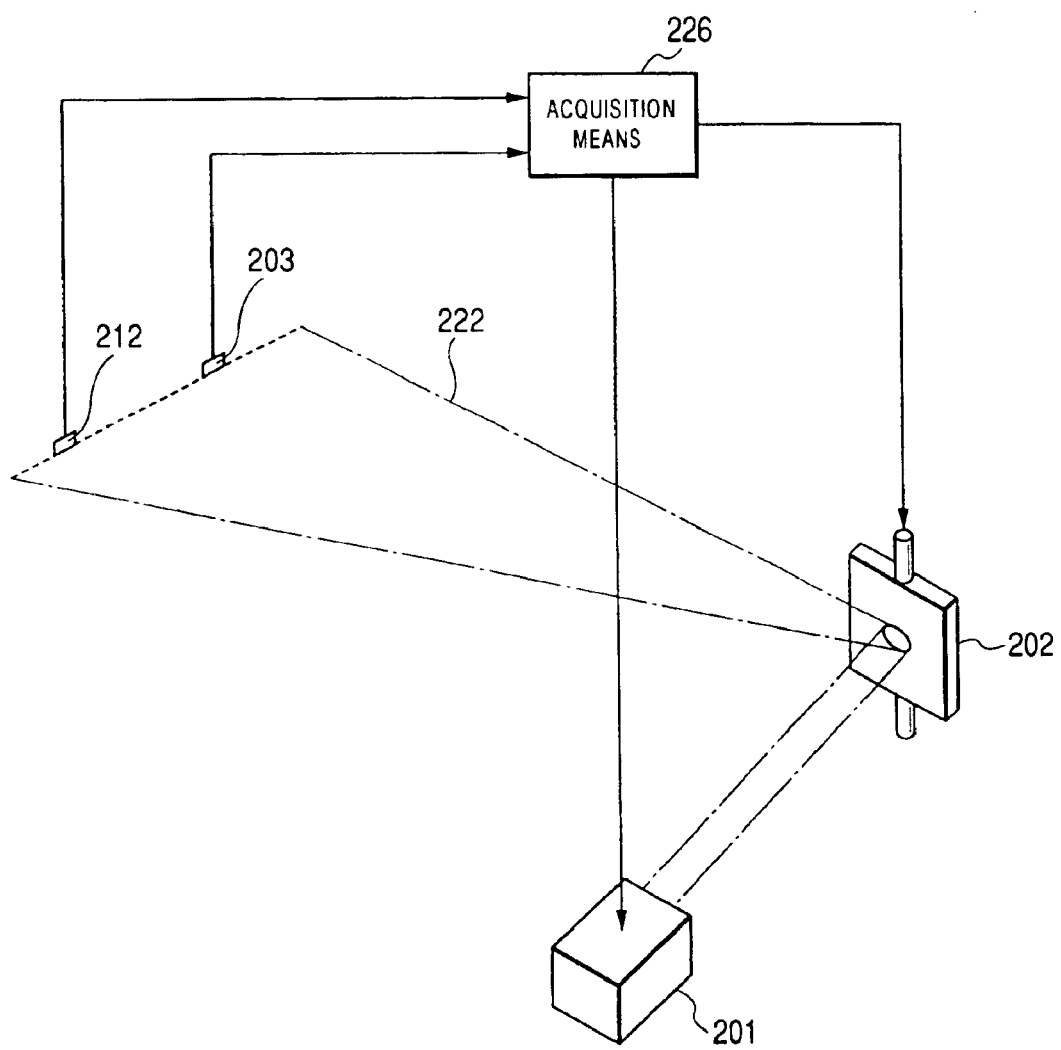
FIG. 13 is a view showing a light beam deflecting apparatus constituting a first embodiment of the present invention.

FIG. 13 is a schematic view showing the configuration of a light beam deflecting apparatus constituting an example 1 of the present invention, for one-dimensional scanning. There are provided a light source 201, a galvanomirror 202 for causing scanning motion of the light beam from the light source 201, photosensors 203, 212 such as photoelectric converting elements for outputting an electric signal in response to a reflected light 222 from the galvanomirror 202, and acquisition means 226 for acquiring information indicating the displacement angle of the galvanomirror 202 based on the outputs of the photosensors 203, 212 and generating a synchronization signal synchronized with the drive signal to be applied to the galvanomirror 202 and a timing signal indicating the drawing start/end timings of the light source 201. The acquisition means 226 collectively includes the measurement circuit 106, control circuit 107, drive circuit 108 and modulation circuit 109 shown in FIG. 5.

The light source 201 is composed of a semiconductor laser of an optical output of about 5 mW, and executes direct modulation by pulse width modulation. The galvanomirror 202 is driven with a sinusoidal drive signal of a frequency of about 10 kHz.

When the drive signal is applied to the deflecting device 202, detection signals of four pulses in total are outputted in a cycle period of the drive signal, and the information is acquired on the displacement angle of the galvanomirror 202 based on the detection signals from the timing sensors 203, 212 and the angles between the timing sensors 203, 212 and the galvanomirror.

As explained in the foregoing, the information indicating the displacement angle of the galvanomirror 202 can be completely obtained by calculating the predetermined data, utilizing at least three of the four pulses.

EXAMPLE 2

In a two-dimensional image forming apparatus similar to that shown in FIG. 5, the galvanomirrors 102, 121 were replaced by a light beam deflecting device prepared integrally by a semiconductor process, as disclosed in the Japanese Patent No. 2983088. In the present example, resonant galvanomirrors were integrated to form a two-axis deflecting device. The resonant frequency was 8 kHz. Other parts are the same as shown in FIG. 5.

As explained in the example 2, the information indicating the displacement angle of the galvanomirror 202 can be completely obtained by calculating the predetermined data, utilizing at least three of the four pulses.

As in the present example, by measuring the passing times in the forward and backward paths, it is rendered possible to predict the vibration of the deflecting device without increasing the number of detectors, and, as a result, to precisely determine the timing of image modulation. Also high speed processing is possible because the time lag in the deflecting device can be simply calculated. Also in case of employing two detectors, the positional accuracy is not required because such detectors are only fixed in the relative positions thereof, so that the screen etc. can be easily installed.

EXAMPLE 3

The present example shows a driving method of detecting the variation in the resonant frequency from a phase shift and varying the drive frequency based on such shift.

Figure 11A:
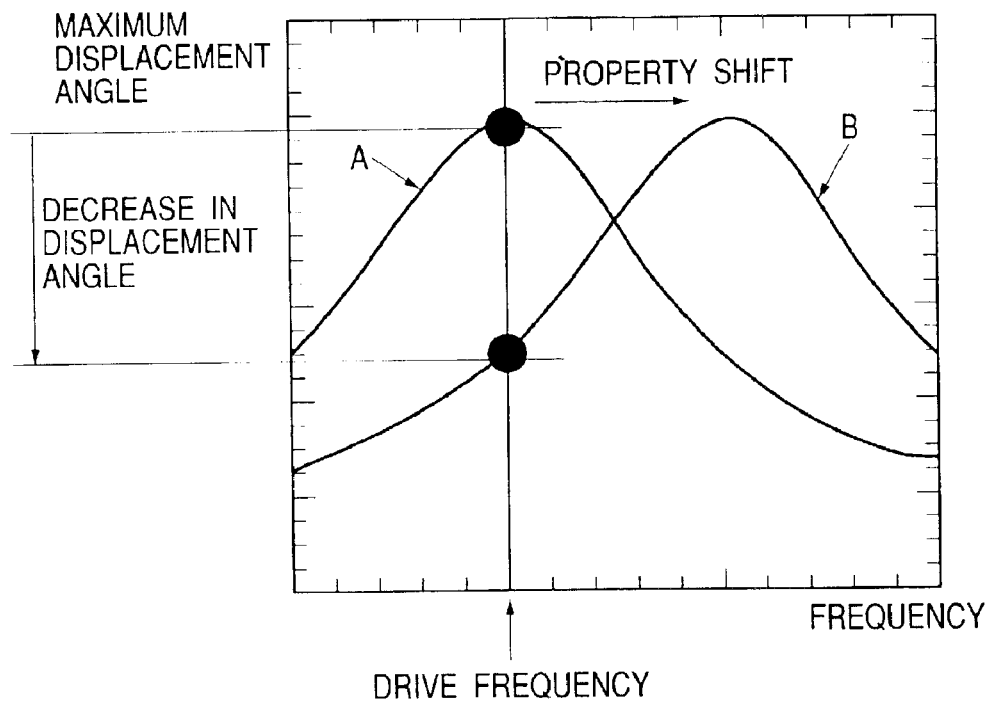
FIGS. 11A and 11B are charts showing the relationship among the drive frequency, maximum displacement angle and phase of a resonant galvanomirror.
Figure 11B:
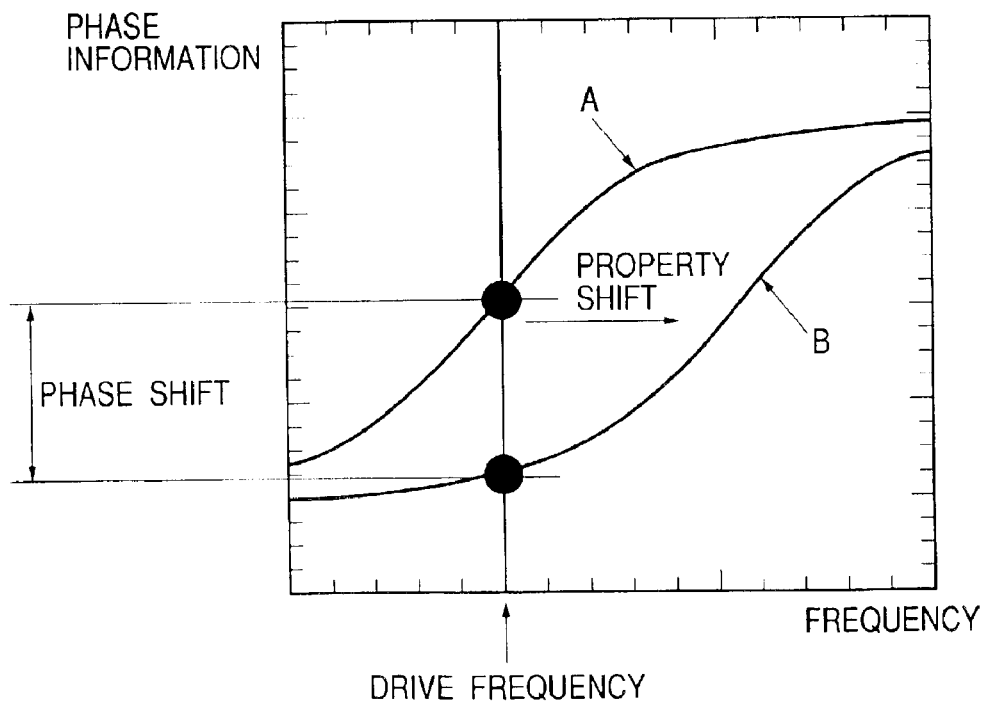

FIG. 11A shows the relationship between the frequency of the drive signal and the maximum displacement angle in a resonant galvanomirror. FIG. 11B shows the relationship between the frequency of the drive signal and the phase. In FIG. 11A, the abscissa indicates the frequency of the drive signal while the ordinate indicates the maximum displacement angle, and, in FIG. 11B, the abscissa indicates the driving frequency while the ordinate indicates the phase shift.

In these charts there are shown two sets of data (characteristics A and B) under different ambient temperatures of the environment in which the light beam deflecting unit is installed.

When the galvanomirror is driven with the resonant frequency, a change in the ambient temperature causes a significant change in the resonant frequency. As a specific example, a change in temperature by 1° C. may induce a change in the resonant frequency by a multiple of 10 Hz. As a result, the characteristic curve indicating the drive signal frequency-maximum displacement angle relationship in FIG. 11A entirely shifts to the left or to the right.

For example, in case of a shift from the characteristics A to B (corresponding to an increase in the resonant frequency), the displacement angle decreases if the drive is continued with the same frequency.

However, in resonant characteristics which are substantially symmetrical about the resonance point (●) as represented by the characteristics A in FIG. 11A, the mere detection of the amplitude only under a change in the frequency does not allow to identify whether the resonant frequency is shifted to the higher side or to the lower side.

Therefore, it is conceived to detect whether the frequency is shifted to the higher or lower side by detecting the change in the phase information of the drive signal. More specifically, as indicated by the characteristics A, B in FIGS. 11A and 11B, the phase information increases or decreases respectively when the resonant frequency changes to the higher side or to the lower side.

The time lag data Dc is correlated with the phase shift ω in the following manner:

$$\omega = 2\pi f(Dc - nT) \times 360$$

(n: integer, 0° < ω < 360°)

In the present example, the scan timing is detected by the method explained in the embodiment 1 or 2 to calculate the time lag Dc, then the phase shift is determined from the above-mentioned equation and the drive frequency of the deflecting device is adjusted to match the resonant frequency by the method explained in the foregoing. The phase shift ω is always controlled at 0 by increasing or decreasing the drive frequency respectively if the phase shift ω is negative or positive, whereby the desired drive signal is applied to the galvanomirror despite of a change in the ambient temperature in the environment of the image forming apparatus.

In the frequency following control in driving the galvanomirror, the phase signal such as the time lag Dc can be used as an input in a phase synchronized loop.

According to the present example, even under a variation in the ambient temperature in the environment of the image display apparatus, the drive frequency can always be brought to the resonance point without causing a variation in the frequency such as wobbling, whereby the image is not distorted and the resonant frequency can be detected on real-time basis.

EXAMPLE 4

In the present example, the drive signals A1, A2 for the galvanomirror 202 are composed of saw-tooth wave of a frequency of about 60 Hz.

Figure 14A:
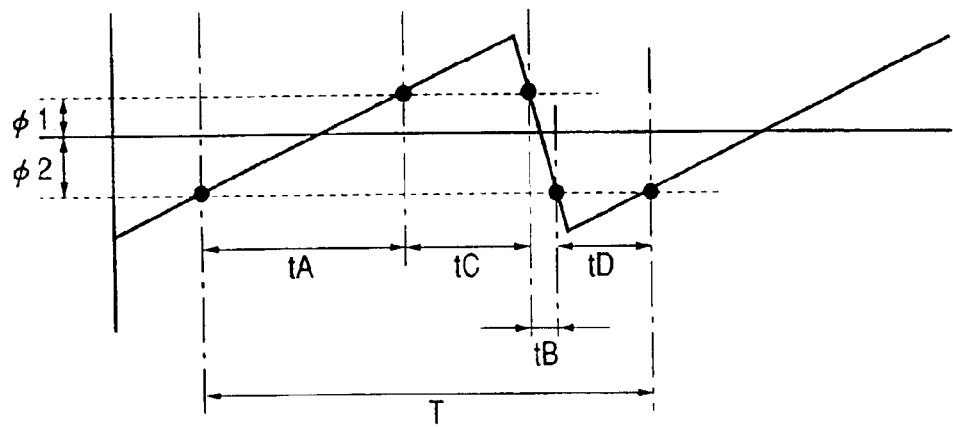
FIGS. 14A and 14B are charts showing vibration of the light beam deflecting device in a fourth embodiment of the present invention.
Figure 14B:
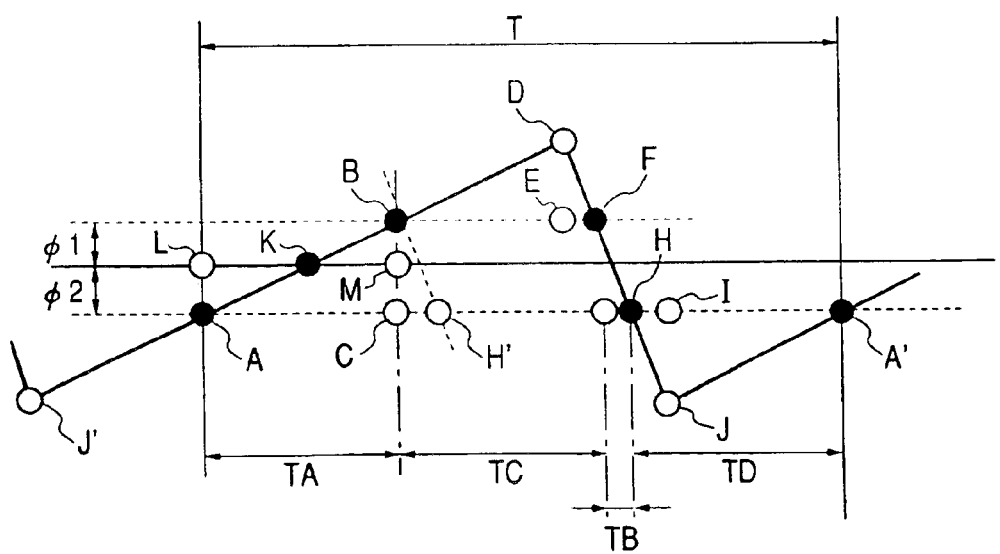

FIGS. 14A and 14B show a method of generating the drive signals A1, A2 by the galvanomirror 202 in the generation means 226. At first there will be explained a method of calculating the maximum displacement angle Θc based on detection signals C1 to C5 of the photosensors 203, 212.

As shown in FIG. 14B, points A to A' are selected on the drive signal A1, with a phase shift TA between the points A and C, a phase shift TC between the points B and F, a phase shift TB between the points F and H, and a phase shift TD between the points H and A'. The points A, B, F, H and A' are crossing points with the displacement angles φ1 and φ2.

Then, as shown in FIG. 14B, an auxiliary line is drawn so as to pass the point B and be parallel to a line connecting the points D and H, and a point H' is defined at the crossing point of the auxiliary line and a line connecting the center points of the drive. Thus, there is obtained a relation:

$$\triangle ABH' \backsim \triangle ABDF$$

and the length CH' is equal to TB.

Then, for calculating the maximum displacement angle Θc, there are determined lengths DE, BD and IJ.

Since ΔABH' and ΔBDF are similar, the length DE can be given, utilizing the length ratio of AH' and BF and taking the length BC as reference, by:

$$DE = BC \times tC/(tA + tB)$$

Also since ΔABH' and ΔA'JH are similar, the length IJ can be given, utilizing the length ratio of AH and A'H and taking the length BC as reference, by:

$$IJ = BC \times tD/(tA + tB)$$

Based on the foregoing equations for DE and IJ, the sum of the lengths DE, BC and IJ is given by:

$$DE + BC + IJ = BC\{tC/(tA+tB) + 1 + tD/(tA+tB)\} = BC(tA+tB+tC+tD)/(tA+tB) = BC \times T/(tA+tB)$$

Since the length BC is equal to φ1, the maximum displacement angle Θc is given by:

$$\Theta c = 2 \times (TA + TB)/T \times \phi 1.$$

In the following there will be explained the relationship between an arbitrary position on J'D and the passing time of the reflected light 222 at such position. At first, the length AL is equal to [DE+BC+IJ] subtracted by [DE+BM] (length above abscissa) and further by [IJ], while the length [DE+BM] is equal to a half of [DE+BC+IJ]. Therefore, based on the foregoing equations for DE and IJ, there is obtained a relation:

$$AL = (DE+BC+IJ)/2 - IJ = BC \times T/(tA+tB)/2 - \{BC \times tD/(tA+tB)\} = BC \times (tA+tB+tC-tD)/2/(tA+tB).$$

Also the inclination of a line fraction AK is given by BC/TA, and, since a relation AL = BC/TA × (t0 − t1) stands for a passing time t1 of the reflected light 222 through the point A and a passing time t0 of the reflected light 222 through the point K, there is obtained a relation:

$$t0 = tA \times (tA+tB+tC-tD)/2/(tA+tB) + t1.$$

Based on the foregoing equations, the displacement angle φα corresponding to the arbitrary position on J'D can be represented, utilizing the passing time tα of the reflected light 222 through such arbitrary position, by:

$$\phi\alpha = \phi 1/tA \times (t\alpha - t0) = \phi 1/tA \times \{t\alpha - tA \times (tA+tB+tC-tD)/2/(tA+tB) + t1\}$$

The present example allows to obtain information indicating the displacement angle of a galvanomirror driven with a saw-tooth wave. In fact an ideal saw-tooth movement of the galvanomirror cannot be obtained by the drive with a saw-tooth signal, but the above-described approximation to the ideal saw-tooth is acceptable under ordinary driving conditions.

EXAMPLE 5

FIG. 8 is a schematic view showing the configuration of a light beam deflecting device of an example 5 of the present invention. In this example, the photosensors 203, 212 are provided not on the screen but within the deflecting apparatus.

More specifically, a beam splitter 204 is provided between the galvanomirror 202 and the vertical scanning mirror 221 as shown in FIG. 8, and the photosensors 203, 212 are positioned on the optical path of a detecting scanning light 206 of which proceeding direction is changed by the beam splitter. Also the drawing scanning light 205, of which proceeding direction is not changed by the beam splitter 204, irradiates the projection plane 210.

The arrangement of the photosensors 203, 212 as shown in FIG. 8 provides an advantage that the detection can be achieved over the entire scanning. In contrast to the configuration shown in FIG. 5, and regardless of the scanning position in the vertical direction of the projection plane 210, the light from the light source 201 enters the photosensors 203, 212 on each horizontal scanning operation, whereby the light source 201 and the galvanomirror 202 can be controlled in more precise manner.

EXAMPLE 6

FIG. 9 is a schematic view showing the configuration of a light beam deflecting device of an example 6 of the present invention. In the present example, in order to detect the displacement wave form of the galvanomirror 202 by the photosensors 203, 212, a separate detecting light source 211 is provided, in addition to the light source 201, in a position outside the optical path of the light from the light source 201.

The detecting light source 211 employs a different wavelength in order to avoid interference with the scanning light. The incident angle of the light from the detecting light source 211 to the galvanomirror 202 is different from that of the light from the light source 201, having the modulation means. The photosensors 203, 212 are provided in positions capable of detecting the scanning light from the detecting light source. Other configurations are the same as those in FIG. 5.

The use of the detecting light source 211 as shown in FIG. 9 allows to increase the image luminance in relative manner, since the light projection amount onto the projection plane is not lowered in comparison with the configuration shown in FIG. 8. It is also easy to optimize the size of the detecting light beam or the arrangement of the photosensors, thereby enabling to acquire information providing a highly precise displacement angle.

In the foregoing examples 1 to 6 of the present invention, there have been explained cases of employing photosensors 203, 212 as the timing sensors for detecting the displacement angle of the light reflecting face of the galvanomirror 202, but the timing sensors are not limited to photosensors but can also be composed of electrostatic sensors incorporated in the galvanomirror or magnetic sensors such as coils. Also it is possible to replace one of the photosensors by an electrostatic sensor and the other by a magnetic sensor.

EXAMPLE 7

FIG. 12 is a schematic view showing the configuration of an image forming apparatus equipped with any of the light beam deflecting units explained in the examples 1 to 6, wherein components equivalent to those in FIG. 13 are represented by corresponding numbers.

The galvanomirror 202 for horizontal scanning is a resonant type and is given a sinusoidal drive signal of about 23 kHz. The light emerging from the galvanomirror 202 enters the timing sensors 203, 212.

A vertical scanning mirror (galvanomirror) 221 is given a saw-tooth drive signal of about 60 Hz, with a flyback time of 10%. The light emerging from the galvanomirror 221 enters timing sensors 203', 212'.

The light source 201 is composed of a semiconductor laser of an optical output of about 30 mW, and executes direct modulation by pulse width modulation. The information indicating the displacement angle in the horizontal and vertical directions are obtained by the method explained in the examples 1, 2 and 5.

The information indicating the displacement angle was obtained in each scanning direction, and was used for control for stabilizing the drive and for generating the modulation start/end timings. The present example allows to obtain the information indicating the displacement angle in each of the different scanning directions and different scanning speeds, thereby enabling to display a high quality image in stable manner.

In the present example, there has been explained an image display apparatus as an example, but the light beam deflecting unit may also be employed in an image drawing apparatus such as a laser printer or a scanning image reading apparatus such as a laser microscope, and such unit may also be utilized as a stand-alone light deflecting apparatus.

As explained in the foregoing, the present invention allows to improve the resolution of image drawing without requiring other sensors, and to achieve compactization and cost reduction of the light beam deflecting unit.

In the foregoing examples, there has been explained an image display apparatus as an example, but the light beam deflecting unit may also be employed in an image drawing apparatus such as a laser printer or a scanning image reading apparatus such as a laser microscope, and such unit may also be utilized as a stand-alone light deflecting apparatus.

What is claimed is:

1. A light beam deflecting apparatus provided with:

a light source for emitting a light beam;

modulation means for modulating the light beam emitting intensity of said light source;

modulation signal generation means for outputting a modulation signal to said modulation means;

a light beam deflecting device for deflecting the light beam emitted from said light source to conduct reciprocating scans;

drive means for driving said light beam deflecting device;

drive signal generation means for outputting a drive signal of a predetermined cycle period to said drive means; and measurement means for respectively measuring two times at which the light beam in reciprocating scan passes a specified position on a scanning line in forward and backward motions relative to a synchronization signal synchronized with the drive signal as a reference, the apparatus comprising:

time lag data calculation means for calculating, based on the measured two passing times in the forward and backward scans, time lag data corresponding to the time lag of the reciprocating scans of the deflecting device relative to the synchronization signal as a reference; and timing data calculation means for calculating, based on the measured two passing times in the forward and backward scans and based on the calculated time lag data, timing data that is referenced to the synchronization signal and that corresponds to a modulation start time or a modulation end time for the light beam within a scanning cycle period;

wherein the modulation signal generation means outputs a modulation signal to the modulation means, based on the calculated timing data.

2. The light beam deflecting apparatus according to claim 1, wherein said time lag data calculation means calculates the time lag data by a linear calculation of the measured two passing times of the light beam in forward and backward scans and the scanning cycle period.

3. The light beam deflecting apparatus according to claim 2, wherein the reciprocating scan of the deflecting device is a symmetrical vibration, and the time lag data are calculated by a linear calculation of an average of the measured two passing times of the light beam in forward and backward scans and the scanning cycle period.

4. The light beam deflecting apparatus according to claim 3, wherein the reciprocating scan of the deflecting device is a sinusoidal vibration.

5. The light beam deflecting apparatus according to claim 3, wherein the reciprocating scan of the deflecting device is a triangular vibration.

6. The light beam deflecting apparatus according to claim 1, wherein the reciprocating scan of the light beam deflecting device is a saw-tooth vibration, and the time lag data are calculated by a linear calculation of an average, weighted by the respective scanning speeds in the forward and backward scans, of the measured two passing times of the light beam in forward and backward scans and the scanning cycle period.

7. The light beam deflecting apparatus according to claim 1, wherein said timing data calculation means utilizes, as parameters in the calculation of the timing data, a specified position on a scanning line for measuring the passing time and a modulation start or end position of the light beam on a scanning line.

8. The light beam deflecting apparatus according to claim 7, wherein said parameter is relative position data of the modulation start or end position with respect to the center position of scanning of the light beam deflecting device.

9. The light beam deflecting apparatus according to claim 7, wherein said parameter is relative position data of said specified position with respect to the center position of scanning of the light beam deflecting device.

10. The light beam deflecting apparatus according to claim 7, wherein said parameter is relative position data of said specified position with respect to the center position of scanning of the light beam deflecting device, and the center position of scanning of the light beam deflecting device is arbitrarily adjustable with respect to a reference position on a projection plane for the light beam.

11. The light beam deflecting apparatus according to claim 1, wherein said drive signal generation means outputs the drive signal to the deflecting device drive means based on the calculated time lag data.

12. The light beam deflecting apparatus according to claim 1, further comprising:
amplitude data calculation means for calculating amplitude data corresponding to the maximum displacement angle of the deflecting device from the measured two passing times in forward and backward scans and the calculated time lag data;
wherein said drive signal generation means outputs, based on the calculated time lag data and the amplitude data, the drive signal to the deflecting device drive means with an increase or a decrease in the cycle period of the drive signal.

13. The light beam deflecting apparatus according to claim 1, further comprising scanning period calculation means for calculating the scanning period from the value of passing time of the light beam, measured over plural scanning periods.

14. The light beam deflecting apparatus according to claim 1, further comprising a beam splitter that divides the light beam deflected by the light beam deflecting device into a first light beam and a second light beam, wherein said measurement means indirectly measures the passing time of the first light beam through a specified position on a first scanning line by measuring the passing time of the second light beam through a specified position on a second scanning line.

15. The light beam deflecting apparatus according to claim 1, wherein said measurement means indirectly measures the passing time of said light beam through a specified position on a scanning line, by measuring the passing time of another light beam, entering said light deflecting device with an angle different from that of said light beam, through a specified position on a scanning line.

16. The light beam deflecting apparatus according to claim 1, wherein a distance between a projection plane of the light beam on which a photosensor of said measurement means for measuring the passing times of the light beam is provided and the deflecting device differs from a distance between a projection plane of the light beam modulated by said modulation means based on the measured passing times and the deflecting device, and the light beam to be measured and the light beam to be modulated are the same light beam.

17. The light beam deflecting apparatus according to claim 1, wherein said measurement means includes a photosensor provided in a predetermined position on a scanning line.

18. The light beam deflecting apparatus according to claim 1, wherein said light deflecting device is a galvanomirror prepared by a semiconductor process.

19. An image forming apparatus provided with the light beam deflecting apparatus according to claim 1.

20. A light beam deflecting apparatus provided with:
a light source for emitting a light beam;
modulation means for modulating the light beam emitting intensity of said light source;
modulation signal generation means for outputting a modulation signal to said modulation means;
a light beam deflecting device for deflecting the light beam emitted from said light source to conduct reciprocating scans;
drive means for driving said light beam deflecting device;
drive signal generation means for outputting a drive signal of a predetermined cycle period to said drive means; and
measurement means for respectively measuring two times at which the light beam in reciprocating scan passes a first specified position and a second specified position on a scanning line in forward and backward scans, relative to a synchronization signal synchronized with the drive signal as a reference, the apparatus comprising:
time lag data calculation means for calculating, based on the measured passing time, time lag data corresponding to the time lag of the reciprocating scans of the deflecting device relative to the synchronization signal as a reference; and
timing data calculation means for calculating, based on the measured passing time and based on the calculated time lag data, timing data that is referenced to the synchronization signal and that corresponds to a modulation start time or a modulation end time for the light beam within a scanning cycle period;
wherein said modulation signal generation means outputs a modulation signal to the modulation means, based on the calculated timing data.

21. The light beam deflecting apparatus according to claim 20, wherein said timing data calculation means utilizes, as parameters in the calculation of the timing data, relative positions of the first and second specified positions for measuring the passing times and a relative position of the modulation start or end position of the light beam on a scanning line with respect to a reference position on a projection plane.

22. A light beam deflecting unit comprising:
a galvanomirror for causing a scan with a light beam emitted from a light source,
a sensor positioned for detecting that the reflected light from said galvanomirror reaches a predetermined displacement angle in the drive of said galvanomirror,
measurement means for measuring the time difference between the start time of a synchronization signal for a drive signal for said galvanomirror and the detection time of a detection signal from said sensor, and calculation means for calculating a time lag in the delayed response of said galvanomirror and the maximum displacement angle thereof under the application of said drive signal, based on the time difference measured by said measurement means and the displacement angle of the light beam at the position of said sensor, with the start time of the synchronization signal as an origin.

23. A driving method for a galvanomirror which is applied with a drive signal of a predetermined cycle period, comprising the steps of:

measuring the time from the rising edge of a synchronization signal synchronized with the drive signal applied to said galvanomirror to the rising edge of a detection signal indicating that a reflected light from said galvanomirror reaches a predetermined displacement angle, and calculating the time lag in the delayed response of said galvanomirror under the application of said drive signal based on said measured time and said predetermined displacement angle of the reflected light, with the start time of the synchronization signal as an origin.

24. The driving method for a galvanomirror according to claim 23, wherein a shift in the frequency of the drive signal for said galvanomirror is calculated relative to the resonant frequency of said galvanomirror, based on the information indicating said displacement angle, thereby calculating the frequency of the drive signal to be subsequently supplied to said galvanomirror.

25. The driving method for a galvanomirror according to claim 23, wherein a drive signal is generated, based on the information indicating said displacement angle, in such a manner that the maximum displacement angle of said driven galvanomirror becomes constant.

26. The driving method for a galvanomirror according to claim 23, wherein the emission timing of the light beam from a light source, which emits the light beam irradiating said galvanomirror, is controlled according to the information indicating said displacement angle.

27. A light beam deflecting unit which is supplied with a drive signal of a predetermined cycle period for driving a galvanomirror, comprising:

first and second sensors for detecting that a reflected light from said galvanomirror reaches first and second displacement angles, measurement means for measuring a time from the rising edge of a synchronization signal synchronized with the drive signal to be applied to said galvanomirror to the rising edges of detection signals from said sensors, and acquisition means for acquiring information indicating the displacement angle of said galvanomirror based on said time measured by said measurement means.

* * * * *